(12) United States Patent
Gill et al.

(10) Patent No.: US 11,267,405 B2
(45) Date of Patent: Mar. 8, 2022

(54) REAR CARGO CONTAINMENT SYSTEMS

(71) Applicant: ABC TECHNOLOGIES INC., Toronto (CA)

(72) Inventors: Harman Gill, Brampton (CA); Avinash Jayakumar, Mississauga (CA); Usman Dulatov, Newmarket (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 16/552,133

(22) Filed: Aug. 27, 2019

(65) Prior Publication Data

US 2020/0070730 A1 Mar. 5, 2020

Related U.S. Application Data

(60) Provisional application No. 62/723,624, filed on Aug. 28, 2018.

(51) Int. Cl.
*B60R 5/04* (2006.01)
*B60R 7/02* (2006.01)

(52) U.S. Cl.
CPC .............. *B60R 5/045* (2013.01); *B60R 7/02* (2013.01)

(58) Field of Classification Search
CPC .. B60R 5/00; B60R 5/04; B60R 5/003; B60R 2011/0024; B60R 5/048; B60R 2011/008; B60R 2011/0082; A47B 96/02; A47B 96/025; A47B 96/04; A47B 96/06; B60P 3/007; B60P 7/0815
USPC ............................................... 296/37.1, 37.6
See application file for complete search history.

(56) References Cited

U.S. PATENT DOCUMENTS

| | | | | |
|---|---|---|---|---|
| 2,574,483 A | * | 11/1951 | Jack | .................... B62D 25/2054 296/3 |
| 3,589,768 A | * | 6/1971 | Wilson | ...................... B60P 7/08 296/24.4 |
| 5,090,337 A | * | 2/1992 | Magistrelli | ............... B60P 1/00 108/67 |

(Continued)

FOREIGN PATENT DOCUMENTS

| | | | | | |
|---|---|---|---|---|---|
| DE | 3127473 | * | 1/1983 | ............. | B62D 31/00 |
| DE | 19935762 | * | 2/2001 | ............... | A47B 3/04 |
| KR | 102253109 B1 | * | 5/2021 | ............. | B60R 11/02 |

*Primary Examiner* — D Glenn Dayoan
*Assistant Examiner* — Kevin P Weldon
(74) *Attorney, Agent, or Firm* — Medler Ferro Woodhouse & Mills PLLC

(57) ABSTRACT

Cargo systems for use in a vehicle cargo compartment that provide a range of selectable cargo carrying configurations. A cargo shelf system includes a first support wall, a second support wall, at least one set of removable shelves supported between one of the support walls and an interior side panel of the vehicle, and a set of retractable shelves supported between the first and second support walls. A cargo divider system includes a tray bin attached to a frame structure of the vehicle, a load floor supported upon the tray bin, a flip-wall divider supported upon the tray bin, and a plurality of laterally displaceable divider walls. Another cargo divider system includes a storage bin, an independently moveable seat-side load floor, and an independently moveable gate-side load floor, the seat-side load floor and the gate-side load floor collectively covering the storage bin to form a generally planar continuous load floor.

17 Claims, 25 Drawing Sheets

(56) References Cited

U.S. PATENT DOCUMENTS

| | | | | |
|---|---|---|---|---|
| 5,598,962 | A * | 2/1997 | Schlachter | B60R 5/045 224/542 |
| 6,062,146 | A * | 5/2000 | Conners | B60R 5/045 108/44 |
| 7,338,110 | B1 * | 3/2008 | Eckloff | B60R 11/00 296/182.1 |
| 9,346,391 | B2 * | 5/2016 | Workman | B60P 3/14 |
| 2004/0089625 | A1 * | 5/2004 | Tsai | A47B 88/402 211/126.2 |
| 2018/0014638 | A1 * | 1/2018 | Hanley | A47B 46/005 |
| 2018/0326913 | A1 * | 11/2018 | White | B60R 7/02 |
| 2019/0217766 | A1 * | 7/2019 | Altobelli | B60P 3/007 |
| 2021/0007478 | A1 * | 1/2021 | Adams | A47F 5/10 |

* cited by examiner

REAR CARGO CONTAINMENT SYSTEMS

CROSS-REFERENCE TO RELATED APPLICATIONS

This application claims the benefit of prior U.S. Provisional Patent Application Ser. No. 62/723,624, filed Aug. 28, 2018, which is hereby incorporated by reference in its entirety for all purposes.

FIELD OF THE INVENTION

The present invention relates to the field of cargo management, and in particular to a variety of cargo management systems incorporated into the rear cargo compartment of a vehicle.

BACKGROUND

Passenger vehicles are generally provided with a cargo compartment towards the rear section of the vehicle. The cargo compartment provides a volume of space suitable for transport of a wide range of cargo elements, such as groceries and sporting goods. Placement of goods within this space can be problematic in respect to both movement of the goods during transport, as well as accessibility. For example, in some SUV-type vehicles, goods that displace forwardly towards the rear passenger seats may be difficult for some people to reach without actually climbing into the cargo compartment. Effective cargo management not only provides a means to reduce the likelihood of damage of goods being transported, but also has the potential to reduce injury to vehicle occupants arising from unwanted movement of such goods during driving events.

SUMMARY OF THE INVENTION

According to an embodiment, provided is a cargo shelf system for use in a cargo compartment of a vehicle. The cargo shelf system includes a first support wall and a second support wall, the first and second support walls being arranged in the cargo compartment in a spaced-apart generally vertical orientation. At least one set of removable shelves is supported between one of the first and second support walls and an interior side panel of the vehicle. A set of retractable shelves is supported between the first support wall and the second support wall. An arrangement of the at least one set of removable shelves and the set of retractable shelves is adjustable from a first stowed position and a second deployed position, to provide the user with a range of selectable cargo carrying configurations.

According to another embodiment of the invention, provided is a cargo divider system for use in a cargo compartment of a vehicle. The cargo divider system includes a tray bin attached to a frame structure of the vehicle, a load floor supported upon the tray bin, and a flip-wall divider supported upon the tray bin, the flip-wall divider being hingedly connected to the load floor. The system also includes a plurality of laterally displaceable divider walls, wherein an arrangement of the flip-wall divider and the plurality of laterally displaceable walls is adjustable to provide a user with a range of selectable cargo carrying configurations.

According to a further embodiment of the invention, provided is cargo divider system for use in a cargo compartment of a vehicle. The cargo divider system includes a storage bin, a seat-side load floor, and a gate-side load floor. The seat-side load floor and the gate-side load floor collectively cover the storage bin to form a generally planar continuous load floor. The seat-side load floor and the gate-side load floor are independently moveable from a stowed position to a deployed position to provide a user with a range of selectable cargo carrying configurations.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE DRAWINGS

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive cargo compartments, it will be appreciated that the technology may be used in other applications, for example within cargo compartments of marine-craft and/or aircraft. Furthermore, there is no intention to be bound by any expressed or implied theory presented in the preceding technical field, brief summary or the following detailed description.

Figure 1:
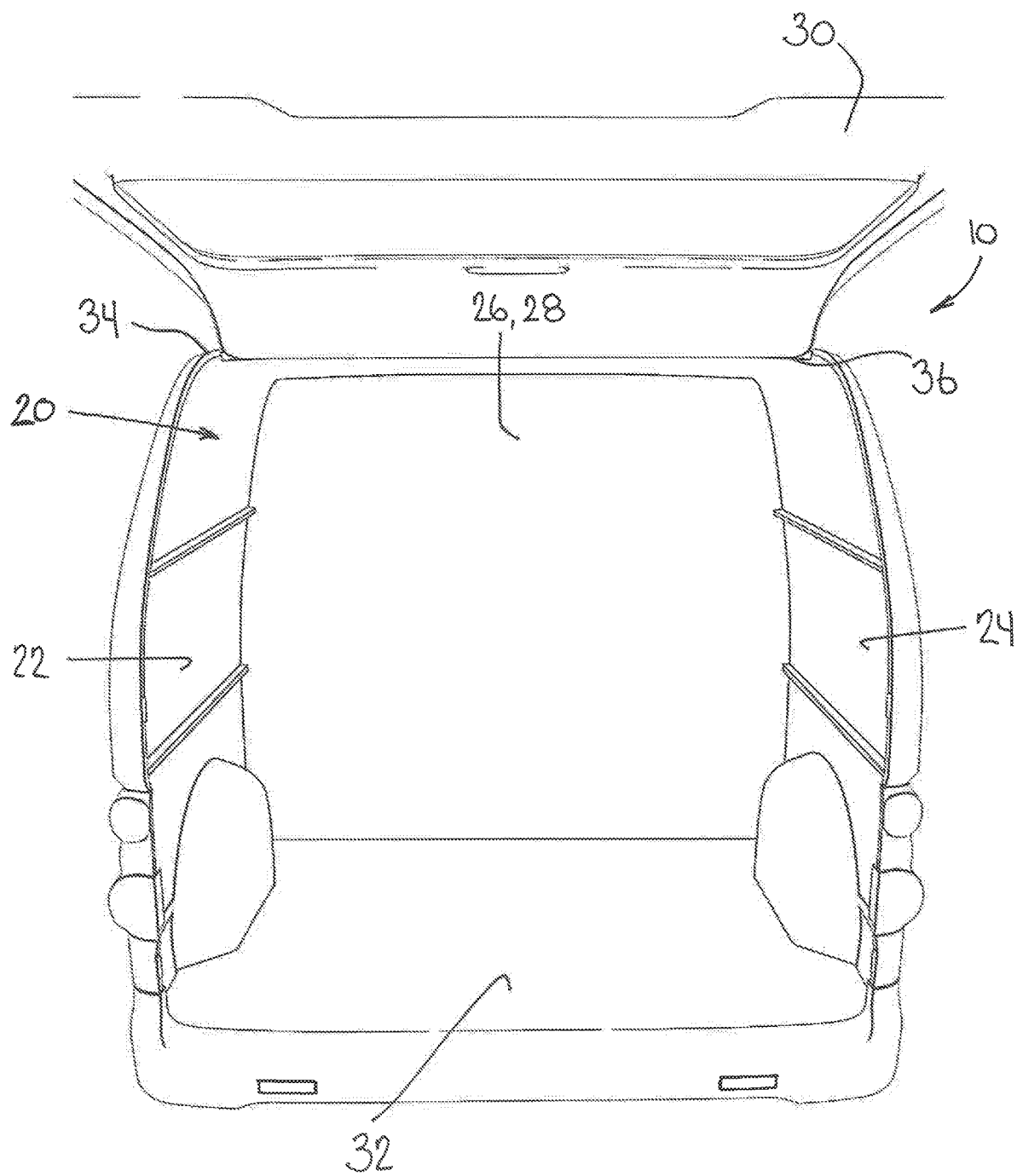
FIG. 1 is a perspective view of a vehicle having a rear cargo compartment, wherein an openable door or hatch of the vehicle is in an open configuration.

Turning now to FIG. 1, shown is a vehicle 10 having a rear cargo compartment 20. The cargo compartment 20 is generally delimited by opposing first and second side panels 22, 24, a rear surface 26 which may be defined by an interior divider wall 28, an openable door 30 or hatch opposite the divider wall 28, a load floor 32 defining a load-supporting base, and an inside surface (not shown) of the roof 34. A variety of vehicles are configured with the rear cargo compartment 20 as shown including, but not limited to, CUVs, SUVs, vans, mini-vans, and commercial vehicles. The cargo compartment 20 is generally accessed through the door 30, hatch or openable access panel, to permit the cargo compartment 20 to be accessed from the outside of the vehicle. As shown, the door 30 is hinged along an upper portion 36, to permit the door 30 to be unlatched and swung upwards, as conventionally known on many vehicles currently available on the market. The door 30 may also be configured to be unlatched and swung to either the left or the right of the vehicle as one unit, or may be split into two halves to create two doors that swing to either side of the vehicle to permit access to the cargo compartment 20.

Figure 2:
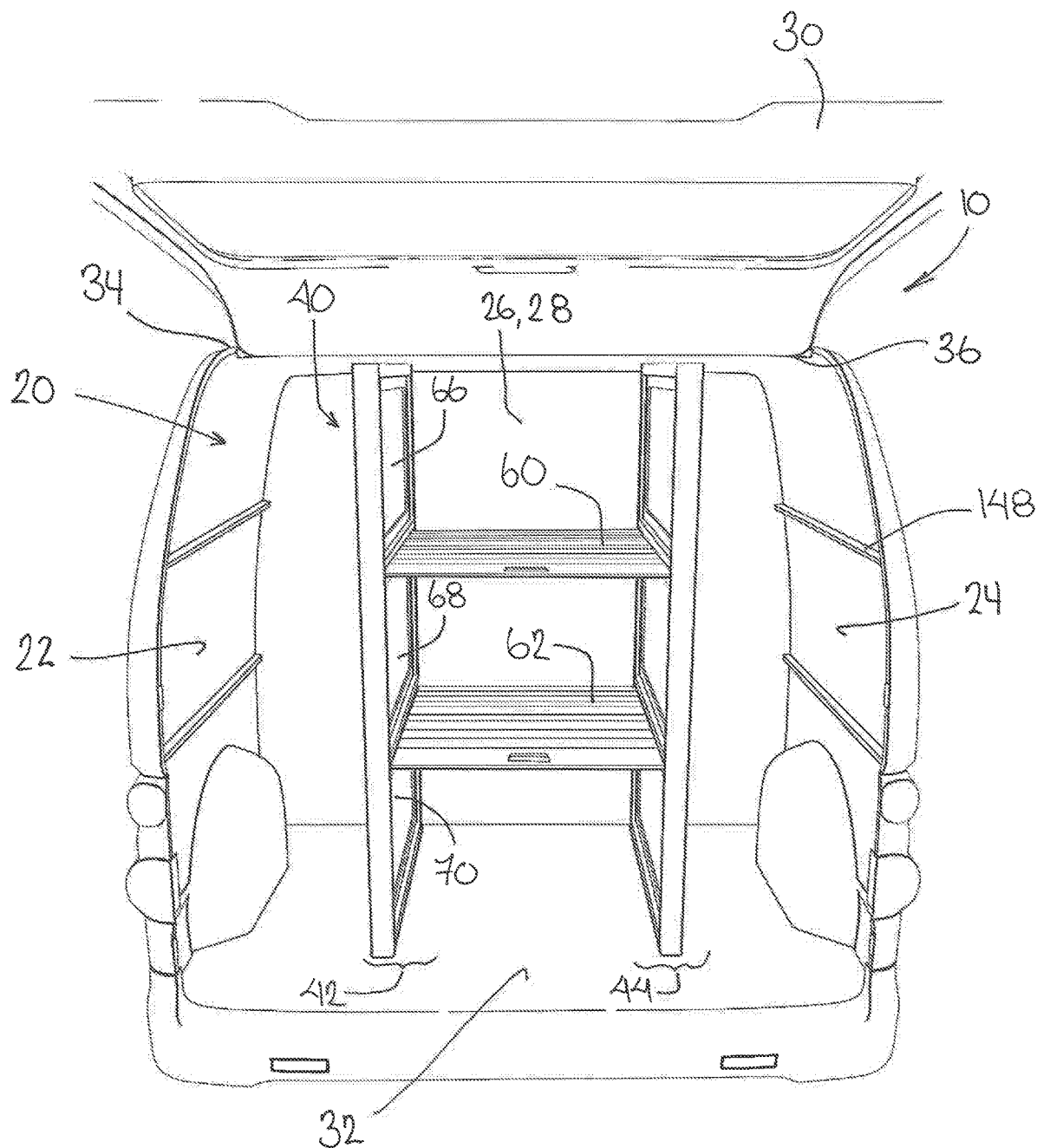
FIG. 2 is a perspective view of a vehicle having a rear cargo compartment, wherein the rear cargo compartment includes an adjustable cargo shelf system according to an embodiment hereof.
Figure 3:
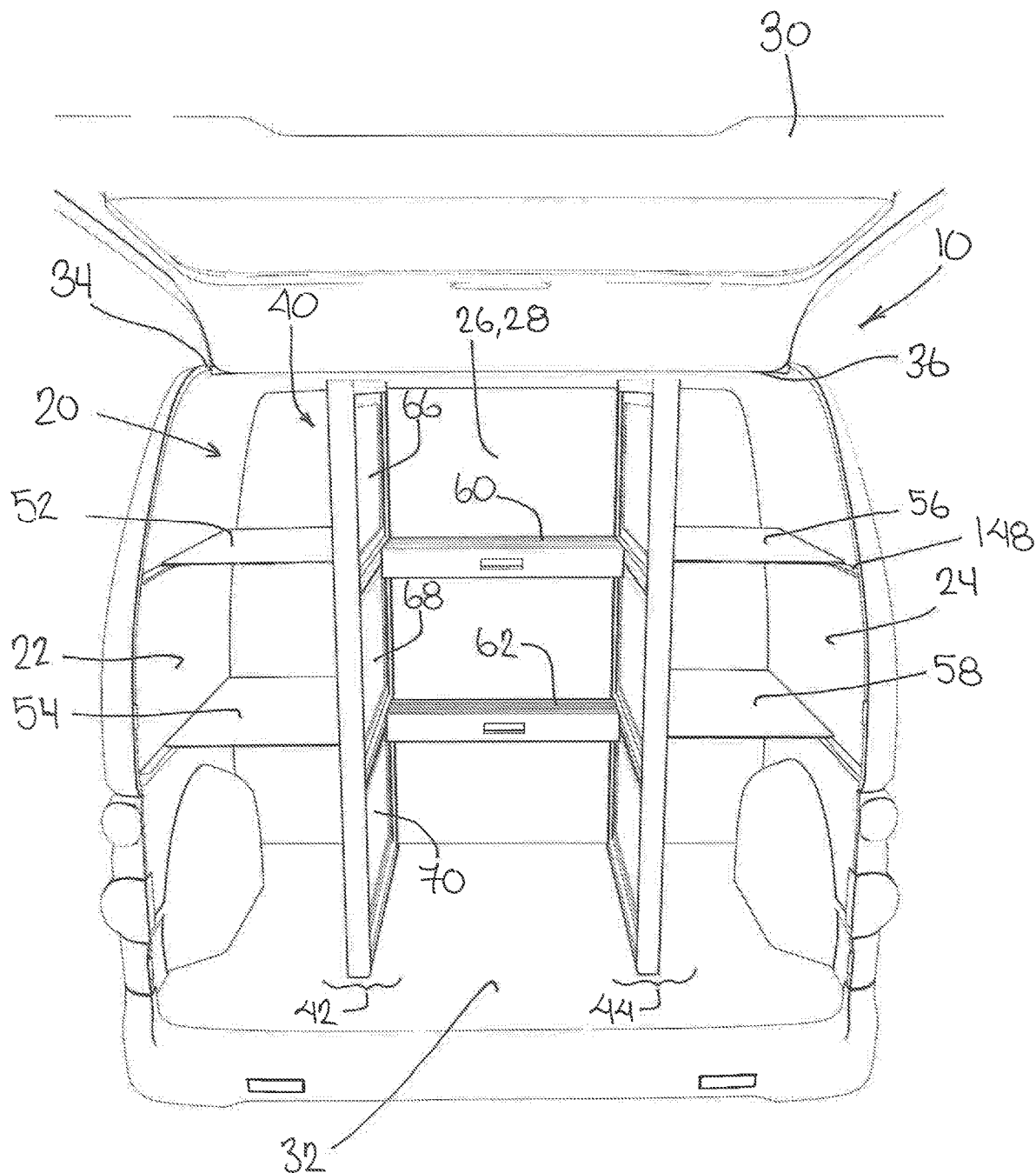
FIG. 3 is a perspective view of a vehicle having a rear cargo compartment, wherein the rear cargo compartment includes an adjustable cargo shelf system and further includes first and second sets of removable shelves according to an embodiment hereof, wherein retractable shelves of the adjustable cargo shelf system are shown in a retracted position.
Figure 4:
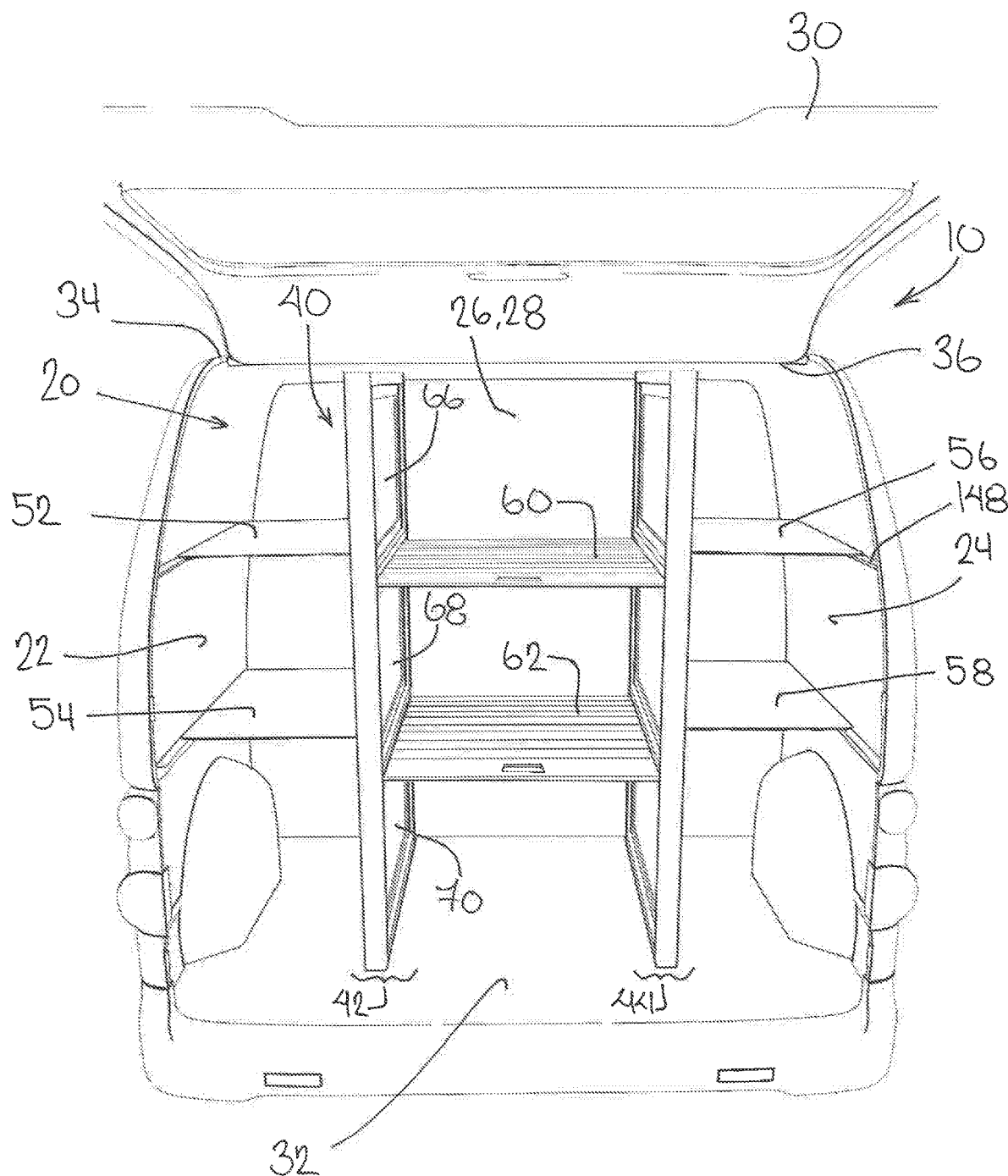
FIG. 4 is a perspective view of a vehicle having a rear cargo compartment, wherein the rear cargo compartment includes an adjustable cargo shelf system and further includes first and second sets of removable shelves according to an embodiment hereof, wherein retractable shelves of the adjustable cargo shelf system are shown in an extended position.

With reference to FIGS. 2, 3 and 4, to facilitate the organized transport of cargo items in the cargo compartment 20, the cargo compartment 20 is provided with an adjustable cargo shelf system 40. The shelf system 40 divides the cargo compartment 20 into discrete volumes that can accommodate a wide variety of cargo sizes, while providing a great deal of flexibility in cargo storage volume. The components and construction approach described may be applied to different vehicle types to suit varying rear compartment sizes.

The shelf system 40 includes a first support wall 42 and a second support wall 44, the first and second support walls 42, 44 being arranged in the cargo compartment 20 in a spaced-apart generally vertical orientation. With reference to FIG. 3, a first set of removable shelves, namely a first removable shelf 52 and a second removable shelf 54 is supported between the first support wall 42 and the first side panel 22. A second set of removable shelves, namely a third removable shelf 56 and a fourth removable shelf 58, is supported between the second support wall 44 and the second side panel 24. A set of retractable shelves, namely a first retractable shelf 60 and a second retractable shelf 62, are supported between the first support wall 42 and the second support wall 44.

Figure 5:
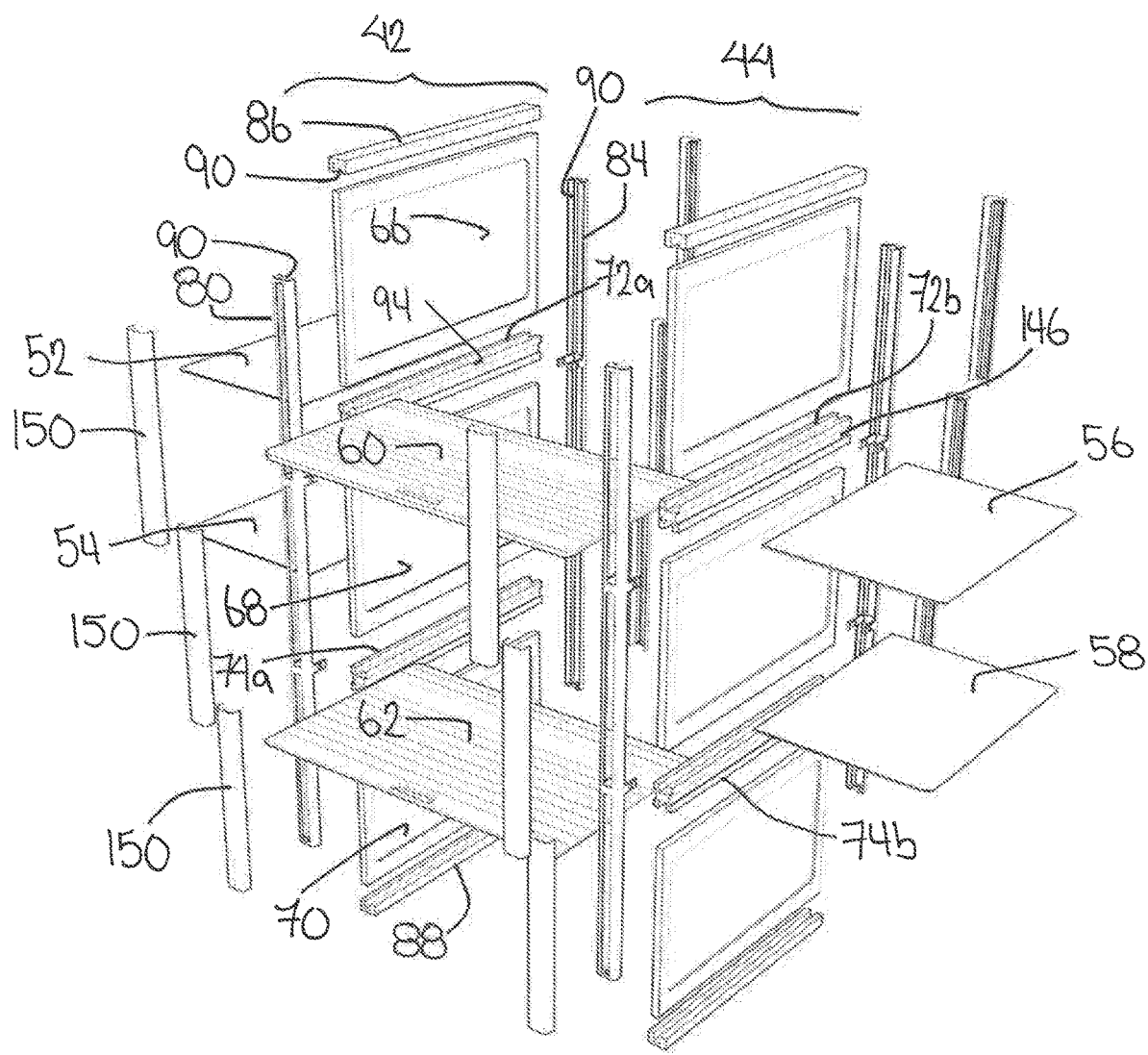
FIG. 5 is an exploded view of the adjustable cargo shelf system and the first and second sets of removable shelves of FIG. 4.

As the first and second support walls 42, 44 are configured in much the same way, only the first support wall 42 will be described in detail. It will be appreciated that the second support wall 44 includes similar structural features that function in much the same way. The first support wall 42 includes a frame-and-panel structure, where a plurality of panels defines a generally planar structure of the wall, and where the plurality of panels is assembled using a peripheral frame and one or more shelf support cross members. As shown, and with additional reference to FIG. 5, the first support wall 42 includes a first wall panel 66, a second wall panel 68, and a third wall panel 70. A first shelf support cross member 72 is provided at the interface between the first and second wall panels 66, 68, while a second shelf support cross member 74 is provided at the interface between the second and third wall panels 68, 70. Note that for the first support wall 42, the first and second shelf support cross members are denoted as 72a, 74a, while for the second support wall 44, the first and second shelf support cross members are denoted as 72b, 74b. The peripheral frame surrounds the entirety of the first, second and third panels 66, 68, 70, and includes a first vertical frame member 80, a second vertical frame member 84, a top frame member 86, and a bottom frame member 88. To facilitate the assembly of the first support wall 42, each of the frame members of the peripheral frame as well as the first and second shelf support cross members 72, 74 include a panel receiving groove 90, as typically found in frame-and-panel construction.

Figure 6A:
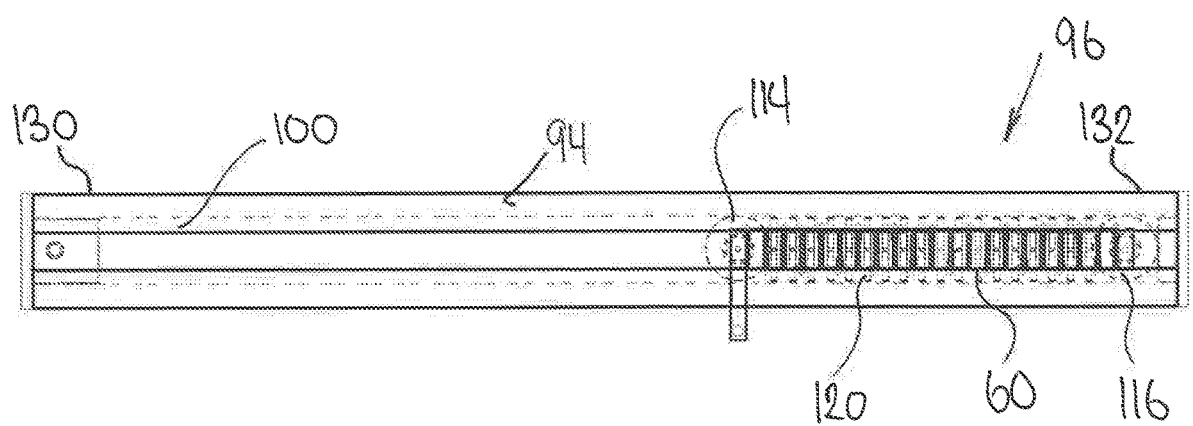
FIG. 6a is a sectional view of a support cross member of the adjustable cargo shelf system of FIG. 5, the sectional view being taken along a length of the support cross member, wherein a retractable shelf of the adjustable cargo shelf system is shown in a first or retracted position.
Figure 6B:
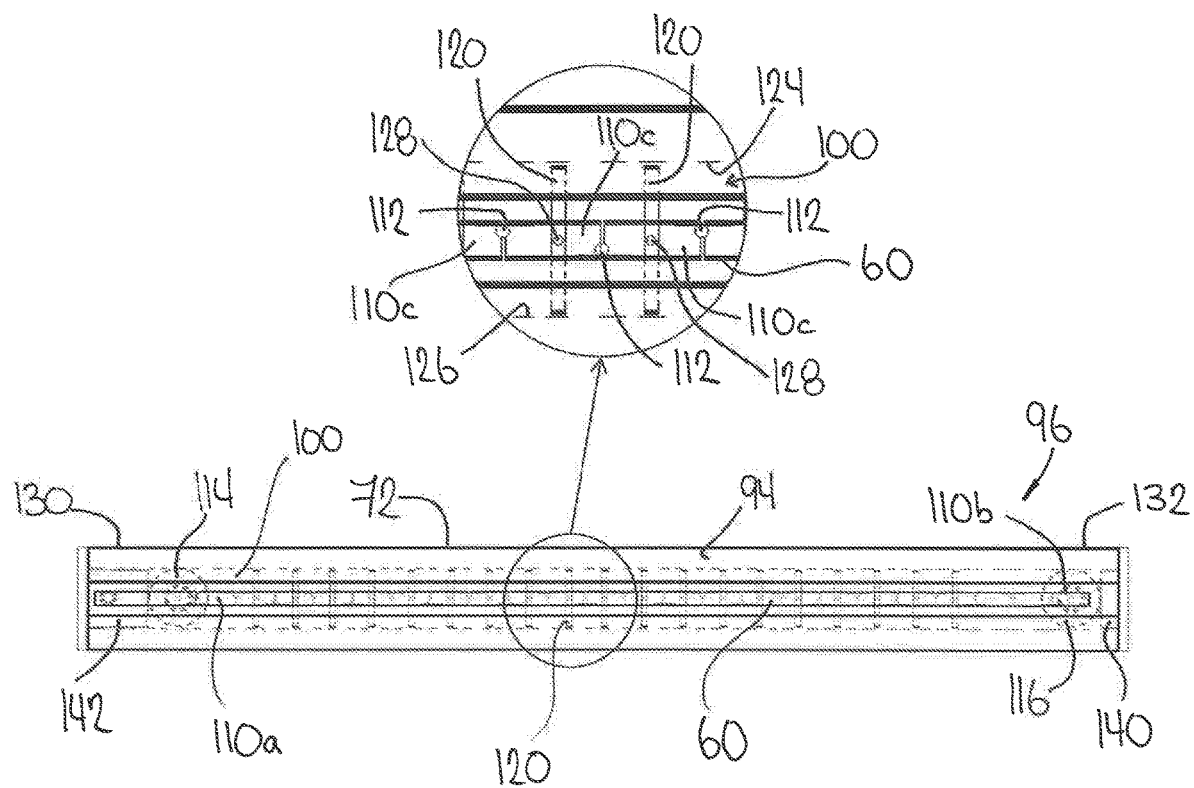
FIG. 6b is a sectional view of a support cross member of the adjustable cargo shelf system of FIG. 5, the sectional view being taken along a length of the support cross member, wherein a retractable shelf of the adjustable cargo shelf system is shown in a second or extended position.
Figure 6C:
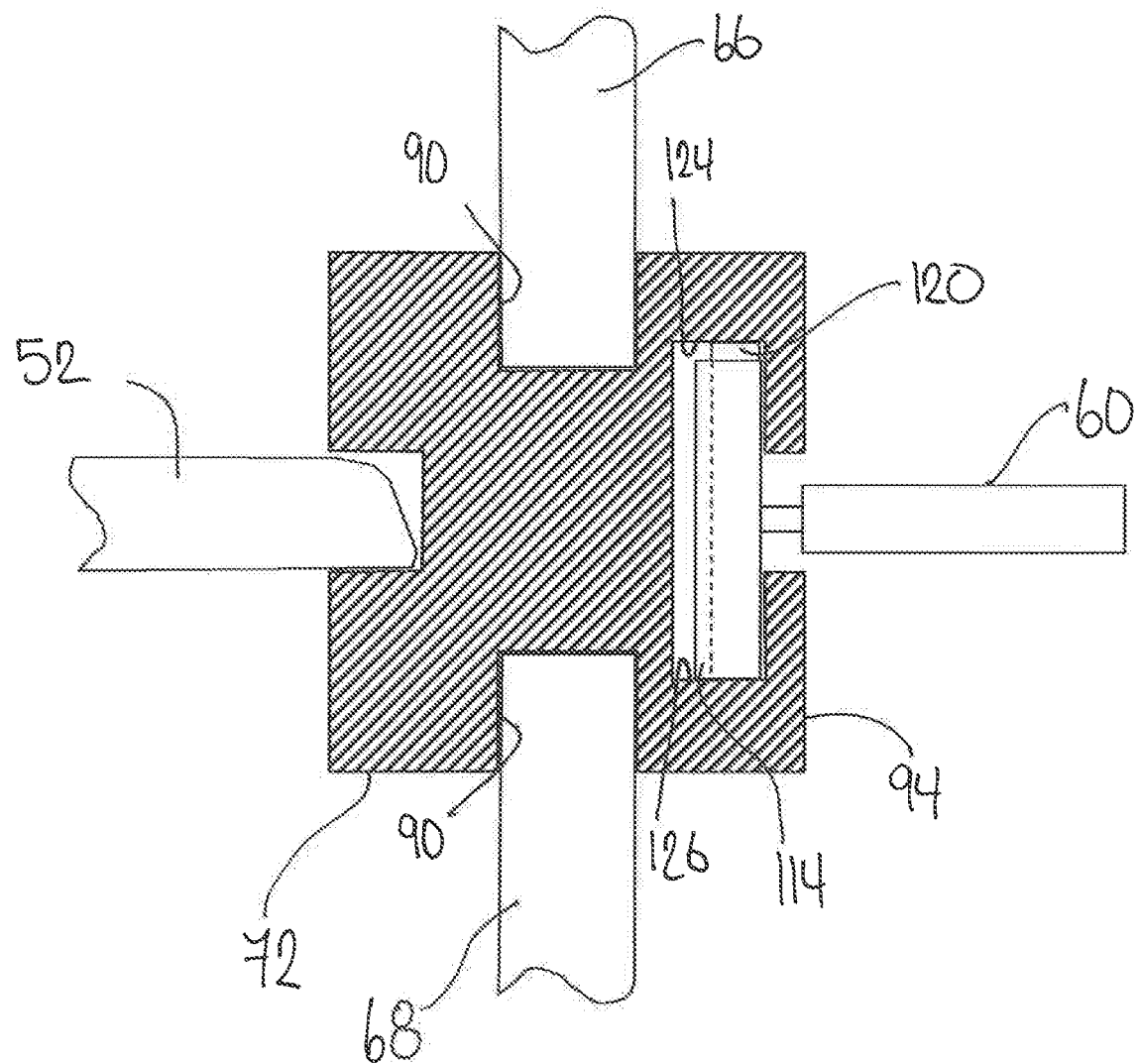
FIG. 6c is a sectional view of a support cross member of the adjustable cargo shelf system of FIG. 5.

The arrangement of the first and second support walls 42, 44 establishes opposing pairs of first and second shelf support cross members 72, 74. The pair of first shelf support cross members 72a, 72b support in a sliding relationship the first retractable shelf 60, while the pair of second shelf support cross members 74a, 74b support in a sliding relationship the second retractable shelf 62. Each of the first and second shelf support cross members 72, 74 provide on an inboard face 94, as shown in FIGS. 6a, 6b, 6c, that is on the side adjacent the respective retractable shelf a track mechanism 96. The track mechanism 96 includes a channel 100 configured to receive a track roller mounted upon the retractable shelf 60.

As the first and second retractable shelves 60, 62 are configured in much the same way, only the first retractable shelf 60 will be described in detail. It will be appreciated that the second retractable shelf 62 includes similar structural features that function in much the same way. The retractable shelf 60 includes a plurality of interconnected slats 110 including a single rearward slat 110a, a single forward slat 110b, and a plurality of intermediate slats 110c therebetween. The retractable shelf 60 is extendable from a first retracted position, as shown in FIG. 6a, to an extended position as shown in FIG. 6b. To facilitate the extension and retraction of the interconnected slats 110, the interconnected slats 110 are hingedly connected along alternating upper and lower interfaces. Any suitable hinge 112 may be used. To facilitate the deployment/retraction of the shelf, the hinge 112 may incorporate a biasing member or may otherwise be configured to apply a biasing force to urge the retractable shelf into a set configuration, i.e., the retracted position. The retractable shelf 60 includes a first track roller 114 and a second track roller 116, each configured to be received within the channel 100 of the track mechanism 96. The first and second track rollers 114, 116 are supported upon respective slats 110 at the most rearward and forward ends of the retractable shelf 60. As shown, the first track roller 114 is supported upon the rearward slat 110a, while the second track roller 116 is supported upon the forward slat 110b. Each of the intermediate slats 110c are supported by a respective slide member 120 also configured to be received within the channel 100. The slide members 120 are dimensioned with a close tolerance fit, so as to slidingly engage an upper bearing surface 124 and a lower bearing surface 126 of the channel 100, while being prevented from rotation therein during the deployment/retraction of the retractable shelf 60. Accordingly, each intermediate slat 110c is rotatably connected at pivot connector 128 to the respective slide member 120 in a manner that permits the intermediate slat 110c to rotate, relative to the slide member 120 it is connected to. In this way, regardless of the deployed position, each intermediate slat 110c of the retractable shelf 60 is fully supported at each end by the respective opposing shelf support cross members 72a, 72b.

In the deployed or extended state, as shown in FIG. 6b, the retractable shelf 60 extends from the most rearward end 130 to the most forward end 132 of the shelf support cross member 72. In the retracted position, with the provision of the track rollers 114, 116 on the respective most rearward and forward slats 110a, 110b, the retractable shelf 60 may be located at either the most forward location as shown in FIG. 6a, or the most rearward location, depending on the cargo configuration needed. To prevent the retractable shelf 60 from unwanted movement between the rearward and forward locations when in the retracted position, a suitable lock such as a pin mechanism (not shown) may be implemented. The most forward and rearward limits of movement for the retractable shelf 60 are defined by stops formed as part of the peripheral frame. As shown, a forward stop 140 is provided at the forward end 132, while a rearward stop 142 is provided at the rearward end 130.

The removable shelves 52, 54, 56, 58 may be configured in a number of ways to permit for placement/removal as required. In the embodiment shown, each removable shelf is supported on one side by the respective shelf supporting cross member, and on the opposing side by the vehicle side panel. As the mounting arrangement for each of the removable shelves 52, 54, 56, 58 is the same, only specific reference is made to the arrangement shown for the third removable shelf 56. With regard to FIGS. 4 and 5, the third removable shelf 56 is supported on one side by the first shelf support cross member 72b of the second support wall 44, specifically within a shelf-support groove 146. On the opposing side of the removable shelf 60, support is provided by a shelf-support bar 148 mounted or formed as part of the second side panel 24. With this arrangement, the third removable shelf 56 can be fully removed by lifting the side proximal the second side panel 24 and removing the shelf 60 from the shelf-support groove 146. Similarly, the third removable shelf 56 can be placed into position by first inserting the shelf into the shelf-support groove 146 on the first shelf support cross member 72b, and then rotating down the shelf 56 to engage the shelf-support bar 148 provided on the second side panel 24. Removable shelves provided in this way can be completely removed from the shelf system 40 and stowed when not in use. Alternatively, each of the removable shelves 52, 54, 56, 58 may be hingedly connected to the respective shelf support cross member, enabling the shelves to be rotated and suitably positioned as required. The positioning of the shelves, that is to assist in maintaining the shelves in the selected position may be facilitated through the use of magnets or other fixtures for releasable retention. In some embodiments, the removable shelves may be self-supporting, and may incorporate a spring load "self-closing" functionality, or locking features.

In some embodiments, the first and second support walls may possess requisite features necessary to mount additional components such as cargo nets, doors, lids etc. to it. The shelf support cross members may also provide features necessary to enable the secure mounting of other components to the shelf system. For example, the shelf system 40 may incorporate additional accessory mounting points such as hooks, knobs, etc. attached to any component described to provide hanging storage for items such as bags, shopping bags, coats or the like.

In some embodiments, the peripheral frame, in particular the portion visible from the rear of the cargo compartment 20 may be provided with an end cap 150 to improve the aesthetic appearance of the peripheral frame from a rearward perspective. The end cap 150 may be customized to provide a visual aesthetic consistent with the vehicle within which this shelf system is used.

The components of the peripheral frame, and the shelf support cross members may be made of materials including, but not limited to carbon steel, aluminum or its alloys, and/or engineered plastics including polyamide (PA), PE, HDPE, ABS, PC-ABS, PP, or glass-fiber or carbon fiber reinforced composites of such materials. In addition, the components of the peripheral frame, and the shelf support cross members may be manufactured by any suitable manufacturing method including, but not limited to extrusion molding.

The wall panels defining the first and second support walls may be made of materials including, but not limited to carbon steel, aluminum or its alloys, and/or engineered plastics including polyamide (PA), PE, HDPE, ABS, PC-ABS, PP, or glass-fiber or carbon fiber reinforced composites of such materials, or composite sandwich materials. Composite sandwich laminate structures such as reinforced paper, metal or polymer honeycomb boards (PCB) may also be used in the construction of the wall panels. The wall panels may additionally include features that serve to provide structural reinforcement or light-weighting characteristics, such as the use of honeycomb reinforcement ribbing.

The wall panels may be manufactured by one or more manufacturing methods including, but not limited to, injection molding, compression molding, thermoforming, stamping, compression/thermoformed, vacuum forming, CNC milling, extrusion, blow-molding, casting, etc.

The components of the removable shelves as well as the slats defining the retractable shelves may be made of materials including, but not limited to carbon steel, aluminum or its alloys, and/or engineered plastics including polyamide (PA), PE, HDPE, ABS, PC-ABS, PP, or glass-fiber or carbon fiber reinforced composites of such materials, or composite sandwich materials. Composite sandwich laminate structures such as reinforced paper, metal or polymer honeycomb boards (PCB) may also be used in the construction of the wall panels. The shelf components may additionally include features that serve to provide structural reinforcement or light-weighting characteristics, such as the use of honeycomb reinforcement ribbing.

The shelf components may be manufactured by one or more manufacturing methods including, but not limited to, injection molding, compression molding, thermoforming, stamping, compression/thermoformed, vacuum forming, CNC milling, extrusion, blow-molding, casting, etc.

Figure 7:
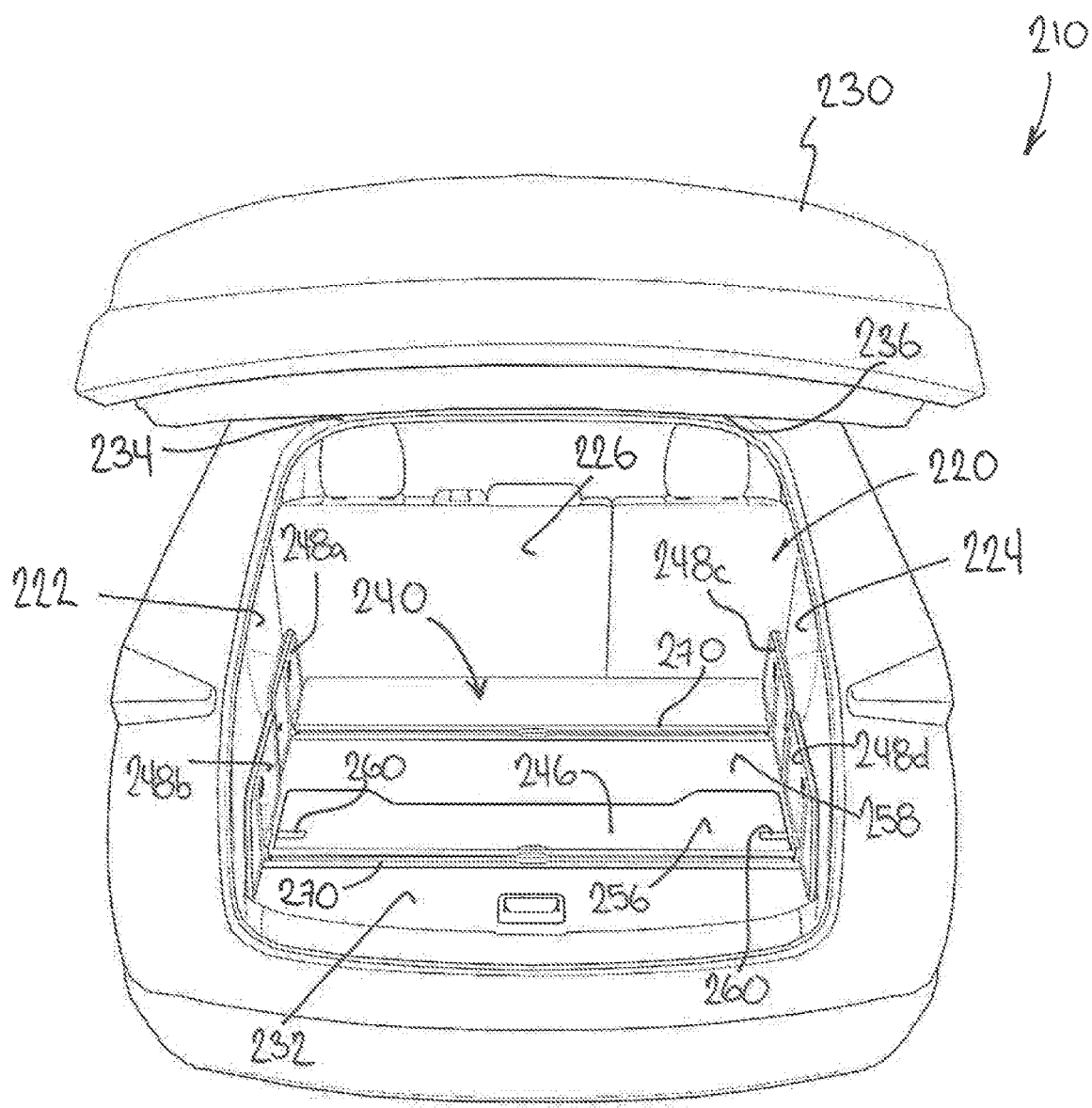
FIG. 7 is a perspective view of a vehicle having a rear cargo compartment, wherein the rear cargo compartment includes a divider system according to another embodiment hereof, the divider system having a flip-wall divider and a plurality of divider walls, and the divider system being shown in a fully stowed configuration with the flip-wall divider and the divider walls in a stowed position.

Turning now to FIG. 7, shown is a vehicle 210 having a rear cargo compartment 220. The cargo compartment 220 is generally delimited by opposing first and second side (quarter) panels 222, 224, a rear surface 226 which may be defined by a rear surface of a rearmost passenger seat 228, an openable door 230 or hatch opposite the rearmost passenger seat 228, a load floor 232 defining a load-supporting base, and an inside surface (not shown) of the roof 234. A variety of vehicles are configured with the cargo compartment 220 as shown including, but not limited to, CUVs, SUVs, vans, mini-vans, and commercial vehicles. The cargo compartment 220 is generally accessed through the door 230, hatch or openable access panel, to permit the cargo compartment 220 to be accessed from the outside of the vehicle. As shown, the door 230 is hinged along an upper portion 236, to permit the door 230 to be unlatched and swung upwards, as conventionally known on many vehicles currently available on the market.

As shown, the cargo compartment 220 includes an adjustable cargo divider system 240. The cargo divider system includes movable divider panels that are housed within the first and second quarter panels of the vehicle. The divider panels slide or roll on a track system provided on the load floor of the vehicle and provide the user with an adjustable way to divide cargo within the cargo compartment 220.

FIGS. 7 to 11 show the divider system 240 in varying configurations, depending on the manner by which the user desires to divide the cargo compartment 220 of the vehicle 210. As shown, the divider system 240 includes a tray bin 244 (best seen in FIG. 8), the load floor 232 supported upon the tray bin 244, a flip-wall divider 246 hingedly connected to the load floor 232, and a system or plurality of laterally displaceable divider walls 248a, 248b, 248c, 248d (collectively referred to herein as divider walls 248).

The tray bin 244 forms the base of the divider system 240 and is attached to the frame structure of the vehicle 210. The tray bin 244 provides the physical features necessary to locate and house other components of the system, as well creating a storage volume above the conventional spare wheel housing of the vehicle 210. The tray bin 244 also provides structural support for the load floor 232, and any cargo or components that are housed upon the load floor 232.

The load floor 232 is of a generally planar construction and is the primary surface for receiving cargo. The load floor 232 additionally contains a recess 250 configured to receive the flip-wall divider 246, as will be described in greater detail below.

The load floor 232 may be covered in textile or non-woven textile type or fabric materials including but not limited to PET non-woven fibers, hard plastic skins such as TPO/TPE, laminate films, wood grain, or metallic sheets, with a core of blow-molded, injection molded or compression molded plastic materials, honeycomb sandwich construction, and/or foam type core materials reinforced with structural cross members.

The flip-wall divider 246 is hingedly connected to the load floor 232 using one or more hinges 252. The one or more hinges 252 are attached to the load floor 232 and the flip-wall divider 246 and pivotally constrain the flip-wall divider 246. The one or more hinges 252 may be free hinged, or friction hinged to provide resistance while opening and closing the flip-wall divider 246. The one or more hinges may be a separate assembly or composed of any material that permits living hinge functionality.

Figure 8:
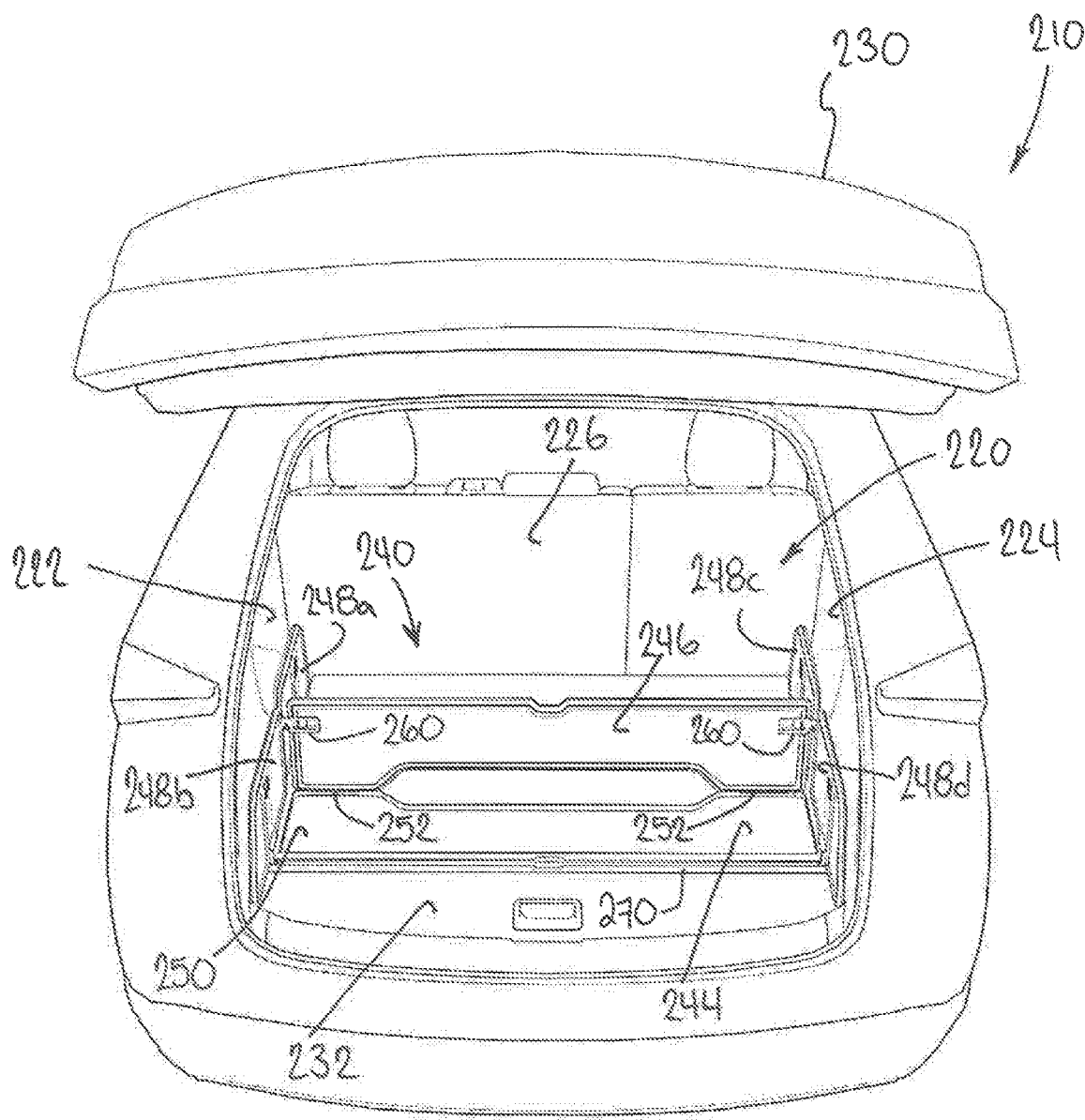
FIG. 8 is a perspective view of a vehicle having a rear cargo compartment according to an embodiment hereof, wherein the rear cargo compartment includes a divider system according to another embodiment hereof, the divider system having a flip-wall divider and a plurality of divider walls, and the divider system being shown with the flip-wall divider in an upright or deployed position and the divider walls in a stowed position.
Figure 9:
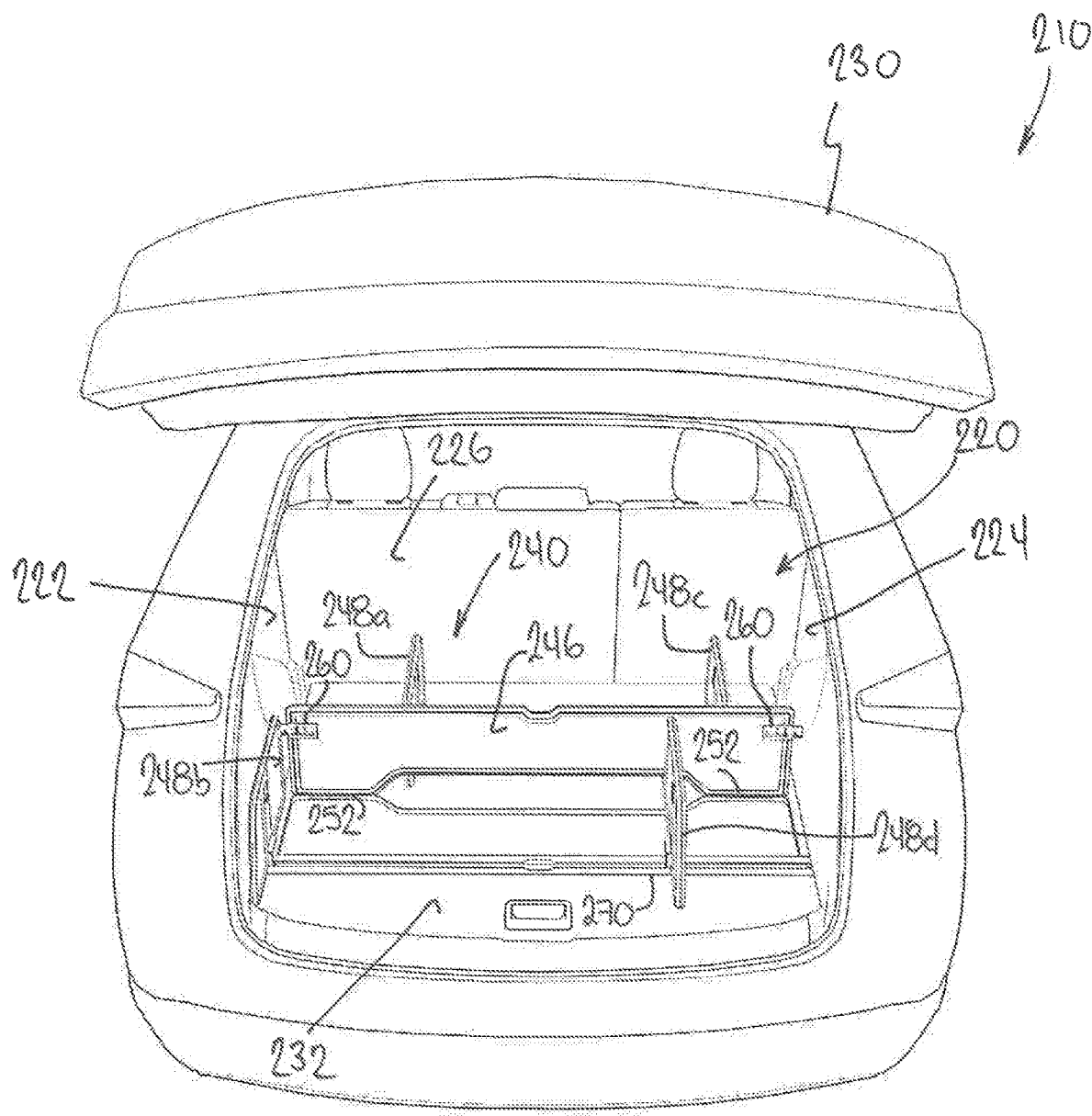
FIG. 9 is a perspective view of a vehicle having a rear cargo compartment according to an embodiment hereof, wherein the rear cargo compartment includes a divider system according to another embodiment hereof, the divider system having a flip-wall divider and a plurality of divider walls, and the divider system being shown with the flip-wall divider in an upright or deployed position and some of the divider walls are in a deployed position.
Figure 10:
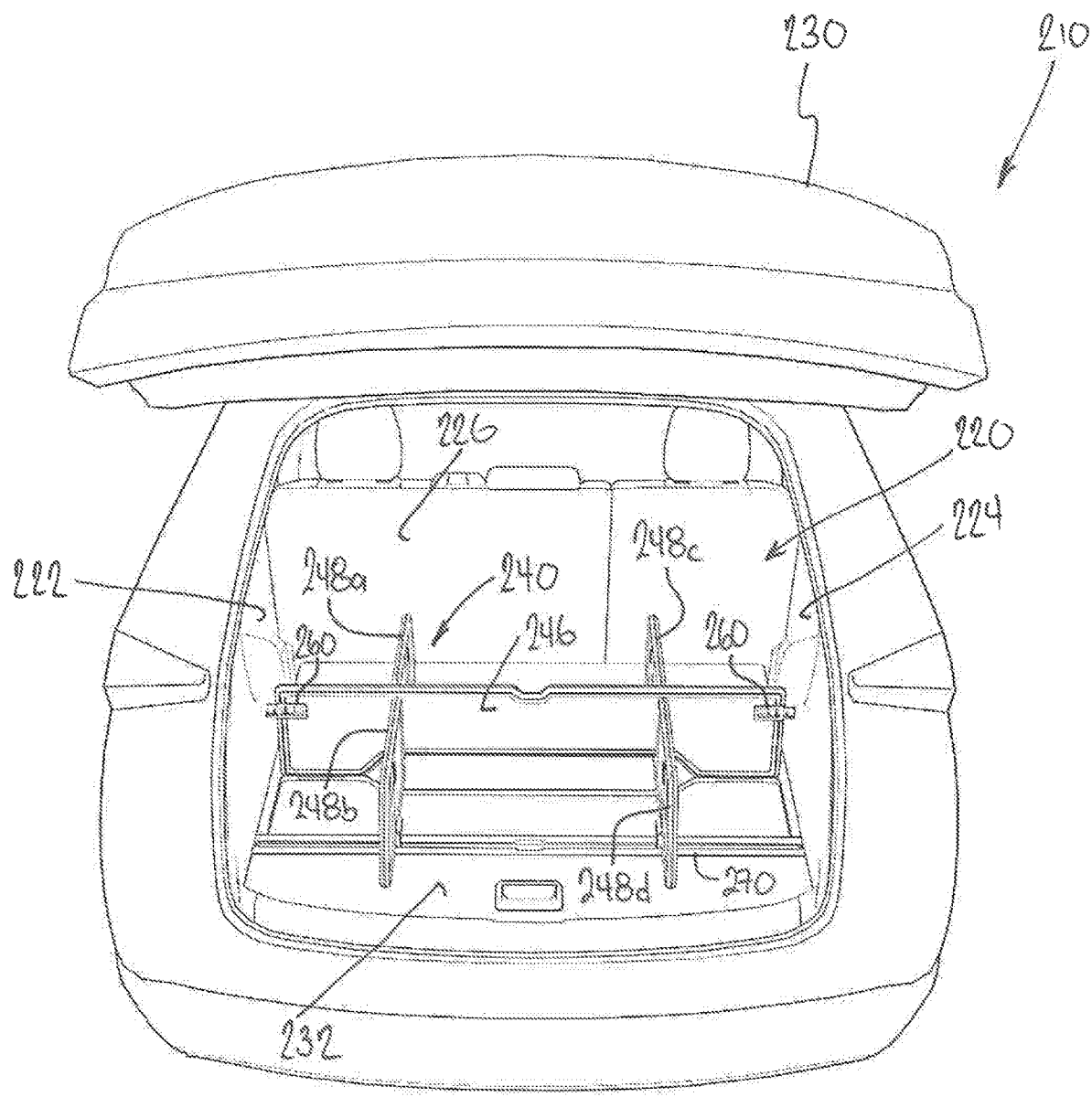
FIG. 10 is a perspective view of a vehicle having a rear cargo compartment according to an embodiment hereof, wherein the rear cargo compartment includes a divider system according to another embodiment hereof, the divider system having a flip-wall divider and a plurality of divider walls, and the divider system being shown with the flip-wall divider in an upright or deployed position and all of the divider walls are in a deployed position.
Figure 11:
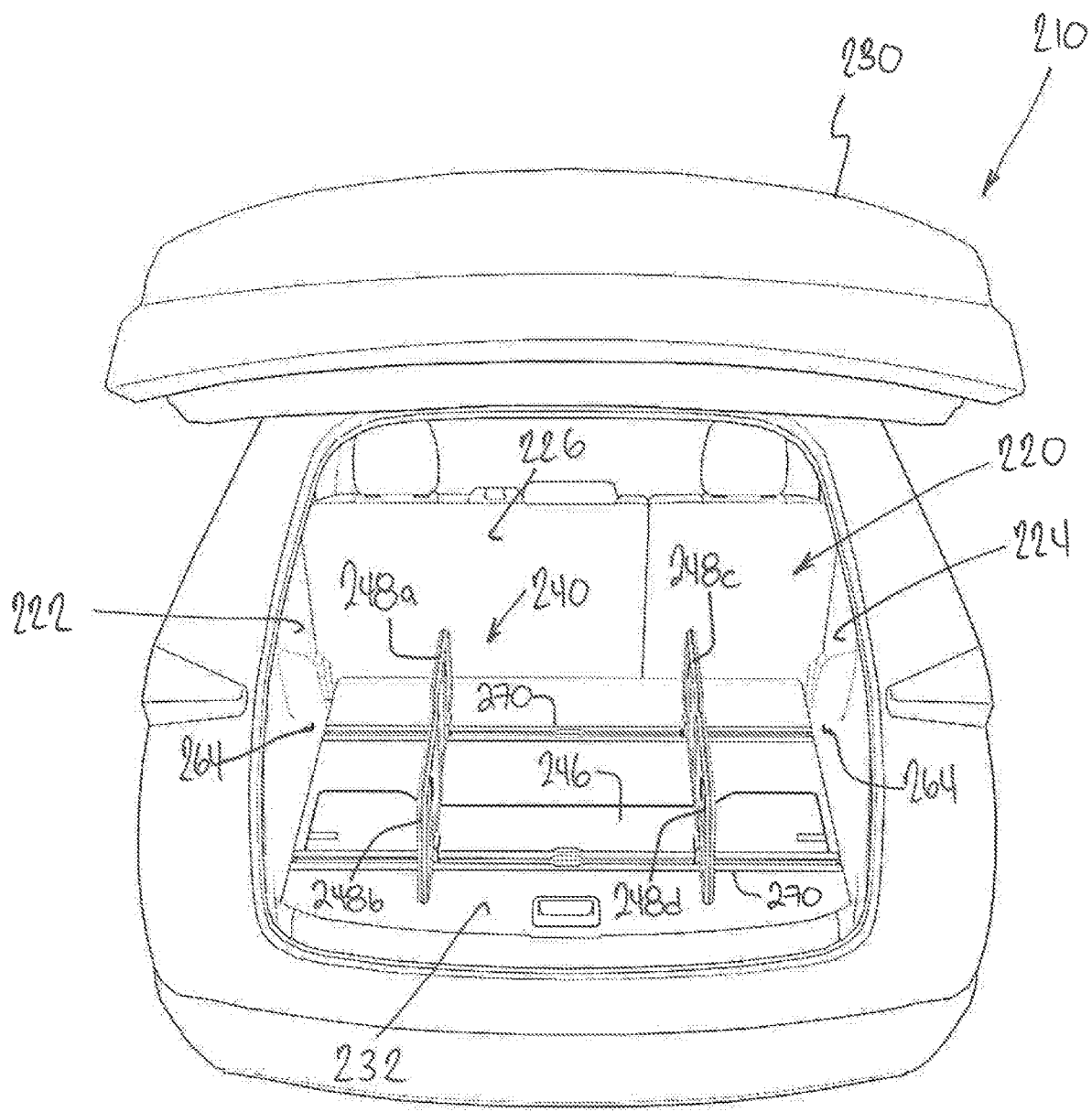
FIG. 11 is a perspective view of a vehicle having a rear cargo compartment according to an embodiment hereof, wherein the rear cargo compartment includes a divider system according to another embodiment hereof, the divider system having a flip-wall divider and a plurality of divider walls, and the divider system being shown with the flip-wall divider in a stowed position and all of the divider walls are in a deployed position.

The flip-wall divider 246 is positionable from a first stowed position as shown in FIGS. 7 and 11, to an open or deployed position as shown in FIGS. 8, 9, 10. In the deployed position, the flip-wall divider 246 separates the available cargo storage area of the cargo compartment 220 in approximately half, in the cross-car direction. In the stowed position, the flip-wall divider 246 is folded on its hinges 252 so that the exposed topside surface 256 forms a plane that is generally parallel and continuous with the topside surface 258 of the load floor 232. The thickness of the flip-wall divider 246 is accommodated within the load floor recess 250, to achieve flush stowage when not in use.

The deployed position for the flip-wall divider 246 is achieved when the flip-wall divider 246 is rotated on the pivotal axis of the hinges 252, such that the topside surface 256 of the flip-wall divider 246 is approximately perpendicular to the topside surface 258 of the load floor 232.

Figure 12:
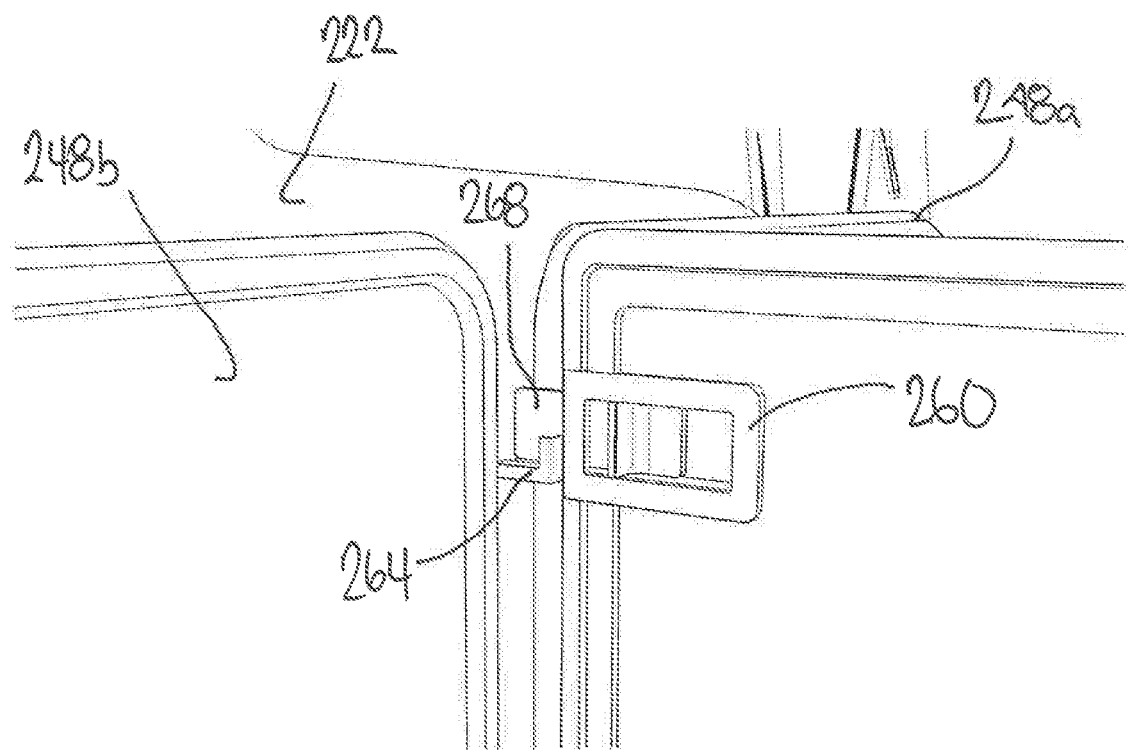
FIG. 12 is a perspective view of a mating lock element configured to keep the flip-wall divider of the divider systems of the above embodiments in the selected position.

The flip-wall divider 246 is held in either the deployed or stowed positions through the engagement of at least one slide-latch lock 260 that is housed in the flip-wall divider 246. As shown, a slide-latch lock 260 is provided on each cross-car side of the flip-wall divider 246. Accordingly, when in the stowed position, each of the slide-latch locks 260 engage a mating lock receptacle (not shown) on the tray bin 244, to prevent unwanted movement/vibration of the flip-wall divider 246. Similarly, when in the deployed position, each of the slide-latch locks 260 engage a mating lock element 264 (shown on FIG. 12) provided on the adjacent quarter panel 222, 224, to keep the flip-wall divider 246 in the selected position, and to prevent unwanted movement/vibration. The slide-latch lock 260 is a mechanical subassembly that includes a laterally sliding member 268 and may be spring loaded to allow the flip-wall divider 246 to be securely held in either the stowed or open positions.

Figure 13:
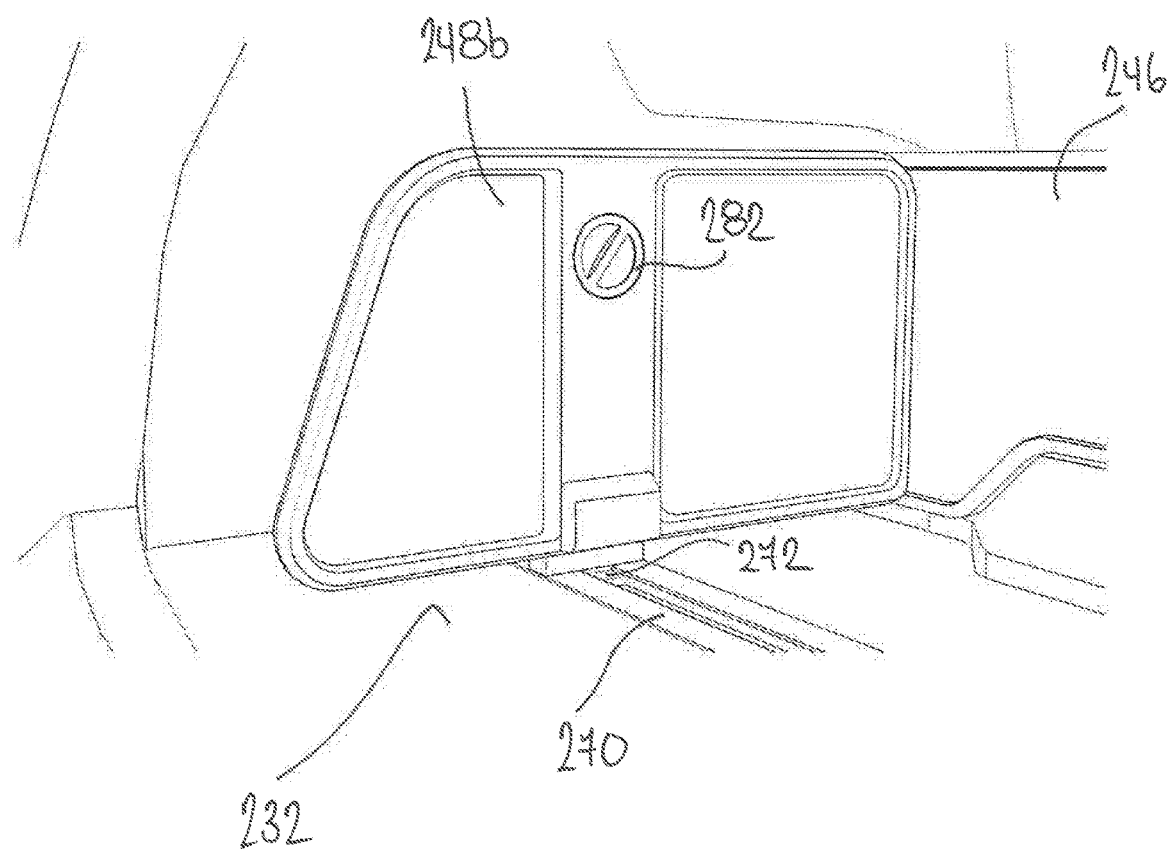
FIG. 13 is a perspective view of a divider wall of the divider systems of the above embodiments, the divider wall including a guide that is configured to cooperate with a track rail to permit the required lateral movement as defined by the user.
Figure 14:
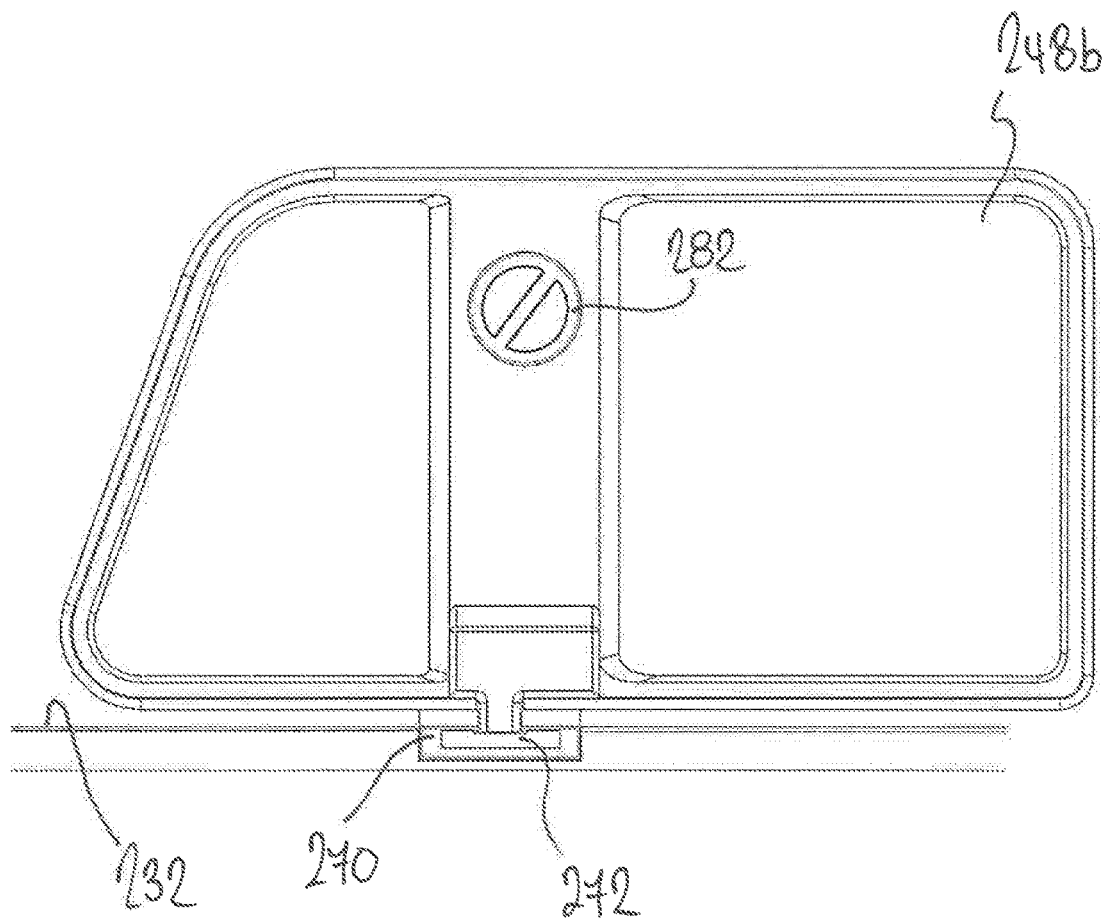
FIG. 14 is a side view of the divider wall of FIG. 13.
Figure 15:
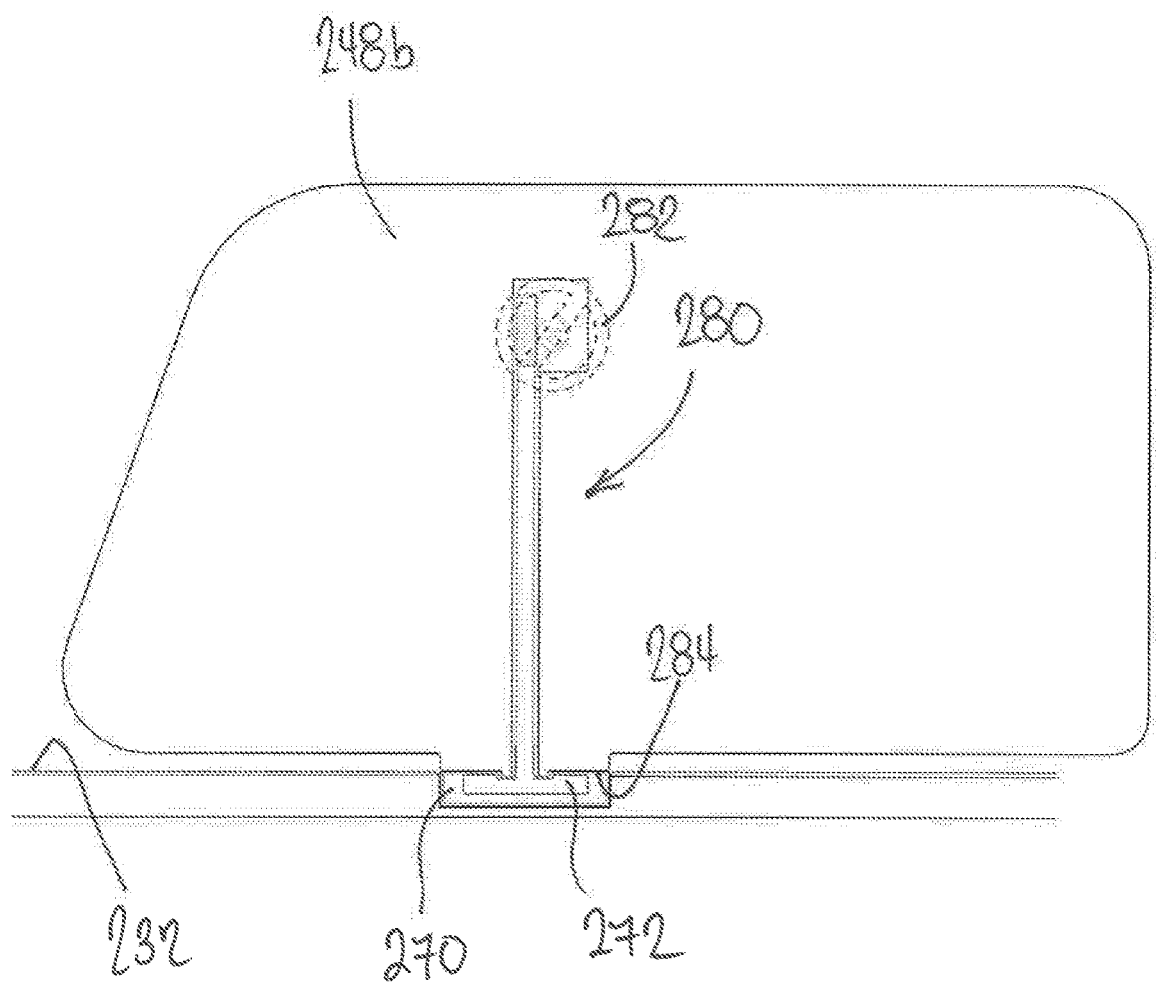
FIG. 15 is a sectional side view of the divider wall of FIG. 13.

The divider walls 248 consist of an assembly of panels and is operable upon a track rail 270 that permits the lateral translation of the panels along the cross-car width of the load floor 232. As shown, the panels that form the divider walls 248 are planar structures that are aligned generally perpendicular to the flip-wall divider 246, that is to the cross-car direction. As best seen in FIGS. 13, 14, 15, the divider walls 248 incorporate a guide 272 that cooperates with the track rail 270 to permit the required lateral movement, as defined by the user. As shown, the track rail 270 is either formed as part of the load floor 232 or mounted thereto. The track rail 270 is provided in the form of a C-channel that mechanically captures the guide 272 and permits for sliding movement therein.

The user may also select to lock the divider wall 248 in a set position. To achieve this, each divider wall 248 may be provided with a locking feature 280 to constrain the lateral motion of the divider wall 248 at any point along the track rail 270. As shown in FIG. 15, the locking feature 280 is an assembly of sub-components that permit the user to lock the divider wall 248 at any position along the track rail 270. In the embodiment shown, the locking feature 280 includes a worm-gear style mechanism to translate the rotation of a lock handle 282 into a vertical translation of the guide 272 located inside the track rail 270. For example, the lock handle 282 may be configured to rotate through a 90° motion from a first unlocked position, to a second locked position. In the unlocked position, the guide 272 is fully disengaged from a bearing surface 284 of the track rail 270, thus permitting the guide 272 to slide freely within the track rail 270. Upon rotation of the lock handle 282 to the locked position, the vertical translation of the guide 272 towards the bearing surface 284 results in mechanical engagement therebetween, thus preventing sliding movement of the guide 272 relative to the track rail 270. With the lock handle 282 in the locked position, the divider wall 248 is retained in the selected position and prevented from any further movement until the lock handle is returned to the unlocked position.

Figure 16:
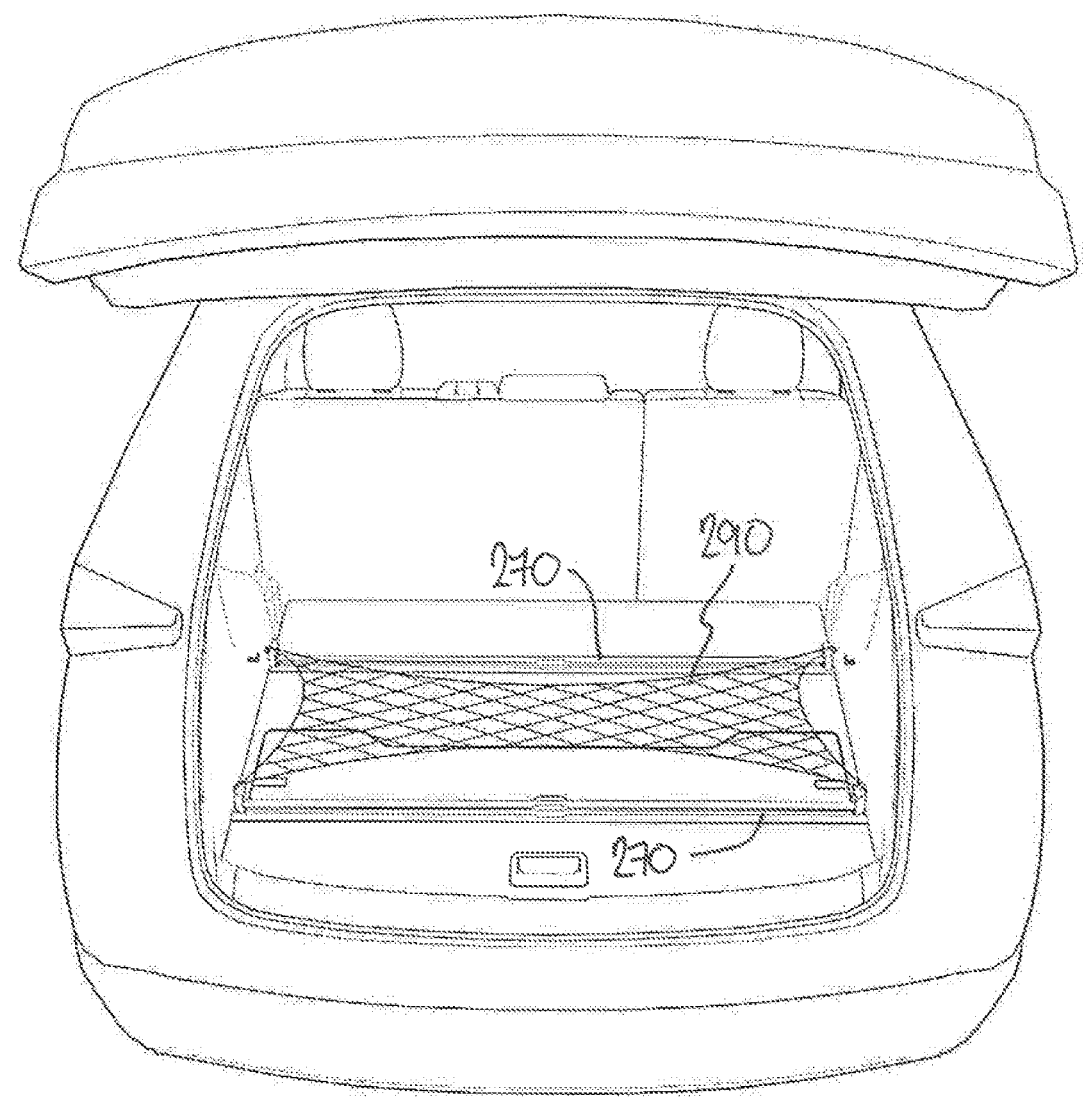
FIG. 16 is a perspective view of a vehicle having a rear cargo compartment, wherein the rear cargo compartment includes a cargo net that is configured to be attached to a track rail according to an embodiment hereof.

In some embodiments, the track rails 270 may be used with other accessories that incorporate similar lockable guide elements as that described above. For example, other items that may be attached to the track rails may include eyelets for cargo securement, cargo nets, other dividers for pet management, etc. For example, as shown in FIG. 16, a cargo net 290 is shown attached to the track rails 270.

As shown in FIGS. 7 through 11, the divider system 240 can be configured in a number of different ways. In FIG. 7, the divider system 240 is in the fully stowed configuration, with the flip-wall divider 246 and the divider walls 248 in the stowed positioned. In FIG. 8, the divider system 240 is shown with the flip-wall divider 246 in the upright or deployed position, dividing the cargo compartment 220 into approximately equally sized forward and rearward compartments. In FIG. 9, the divider system 240 is shown in a configuration where the flip-wall divider 246 is in the upright or deployed position, and where the divider walls 248a, 248c, 248d are deployed, that is moved laterally away from the quarter panel adjacent to which each divider wall 248 is generally stowed. FIG. 9 demonstrates that the cargo areas defined by the flip-wall divider 246 and the divider walls 248 may be customized/varied for a particular need. In FIG. 10, the divider system 240 is shown in a configuration where the flip-wall divider 246 is in the upright or deployed or position, and where the full complement of divider walls 248 are deployed, that is moved laterally away from the quarter panel adjacent to which each divider wall 248 is generally stowed. In FIG. 11, the divider system 240 is shown with the divider walls deployed similar to that shown in FIG. 10, but with the flip-wall divider 246 in the stowed position. It is apparent from these Figures that the divider system 240 may be configured in a wide variety of ways, as needed for a particular cargo carrying application.

Figure 17:
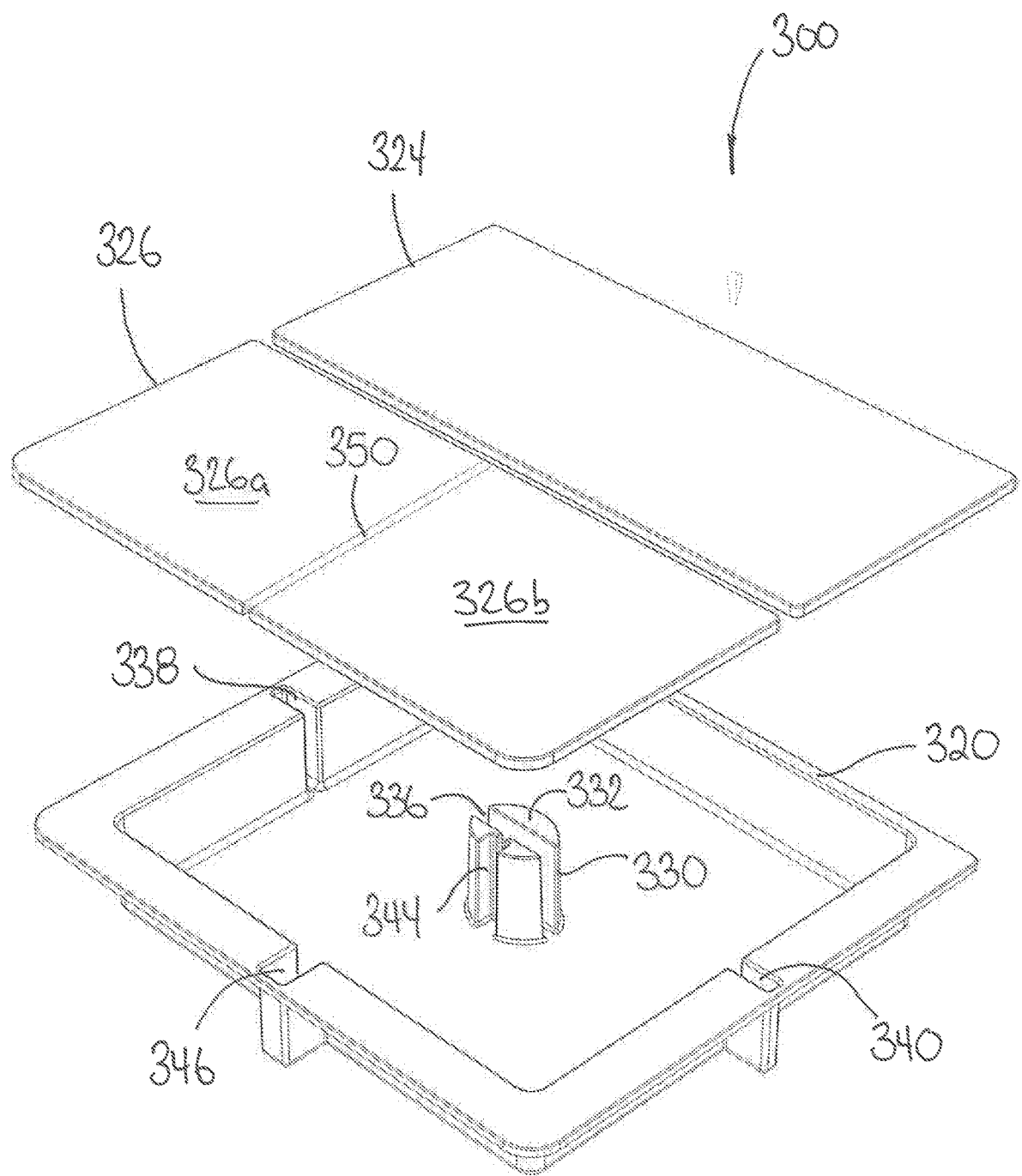
FIG. 17 is a perspective exploded view of a cargo divider system for use in a rear cargo compartment of a vehicle according to another embodiment hereof, the cargo divider system including a storage bin, a seat side load floor and a gate-side load floor.

Turning now to FIG. 17, shown is another embodiment of a cargo divider system 300 for use in the rear cargo compartment of a vehicle. A variety of vehicles are configured with a cargo compartment that may implement the cargo divider system 300 including, but not limited to, CUVs, SUVs, vans, mini-vans, and commercial vehicles.

Figure 18:
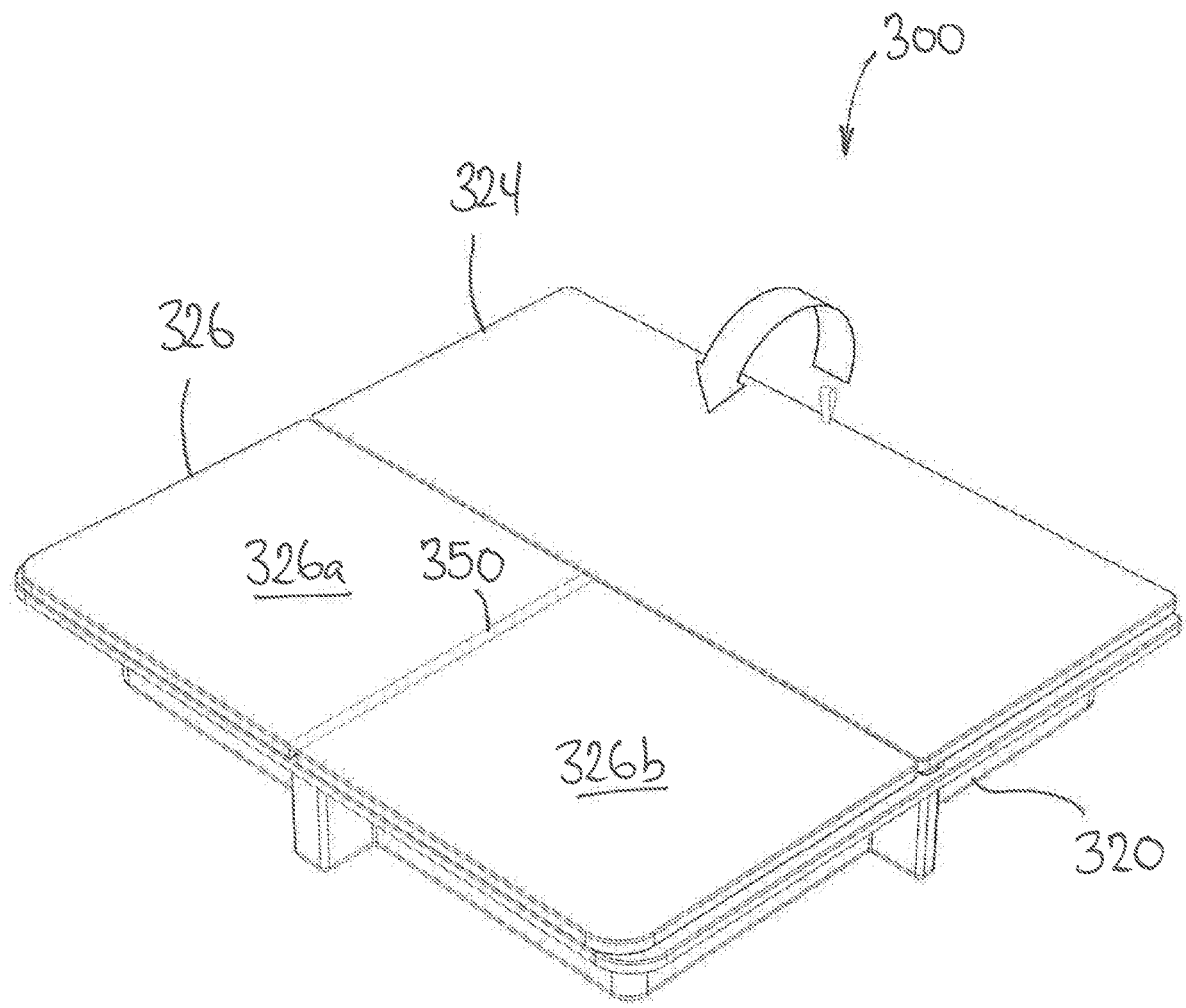
FIG. 18 is a perspective view of the cargo divider system of FIG. 17, wherein the seat-side and gate-side load floors are supported upon the storage bin, the seat-side and gate-side load floors each being shown in a first or horizontal position.

As shown, the cargo divider system 300 includes a storage bin 320, a seat side load floor 324 and a gate-side load floor 326. The seat-side load floor 324 is generally located on the storage bin 320 in a position that is proximal a rear seat of the vehicle. The gate-side load floor 326 is generally located on the storage bin 320 in a position that is proximal a rear access gate of the vehicle, such as the tail/lift gate common on the aforementioned vehicle types. The seat-side and gate-side load floors 324, 326 are supported upon the storage bin 320 in a manner to as to form a generally planar load floor, as shown in FIG. 18. Additional support for the seat-side and gate-side load floors 324, 326 is provided by a support tower 330 centrally located on the storage bin 320. The support tower 330 provides a bearing surface 332 that supports the underside surface of the seat-side and gate-side load floors 324, 326 when arranged in the planar configuration (as shown in FIG. 18).

Figure 19:
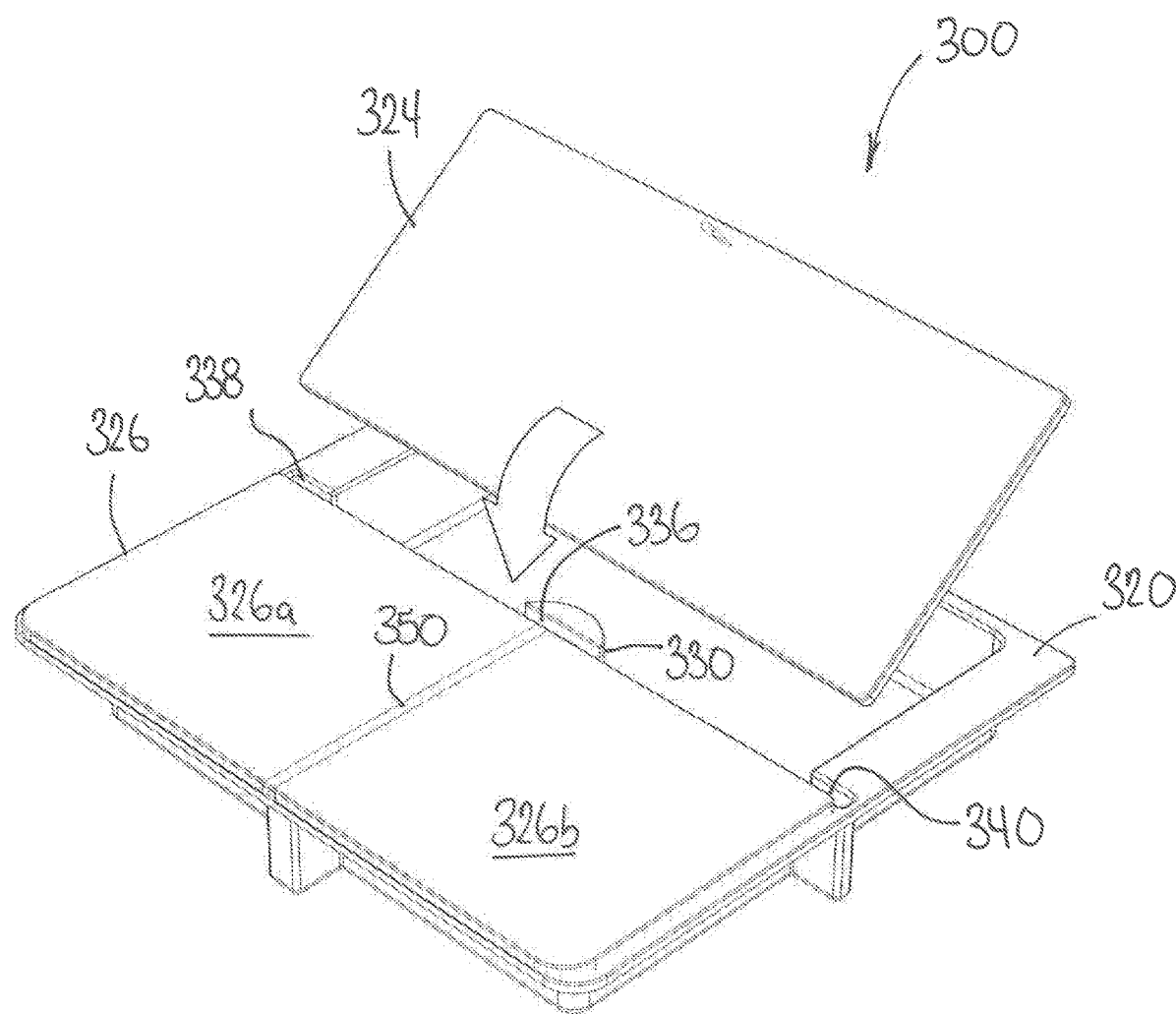
FIG. 19 is a perspective view of the cargo divider system of FIG. 17, wherein the seat-side and gate-side load floors are supported upon the storage bin, the gate-side load floor being shown in a first horizontal position and the seat-side load floor being shown in an intermediate position during relocation thereof.
Figure 20:
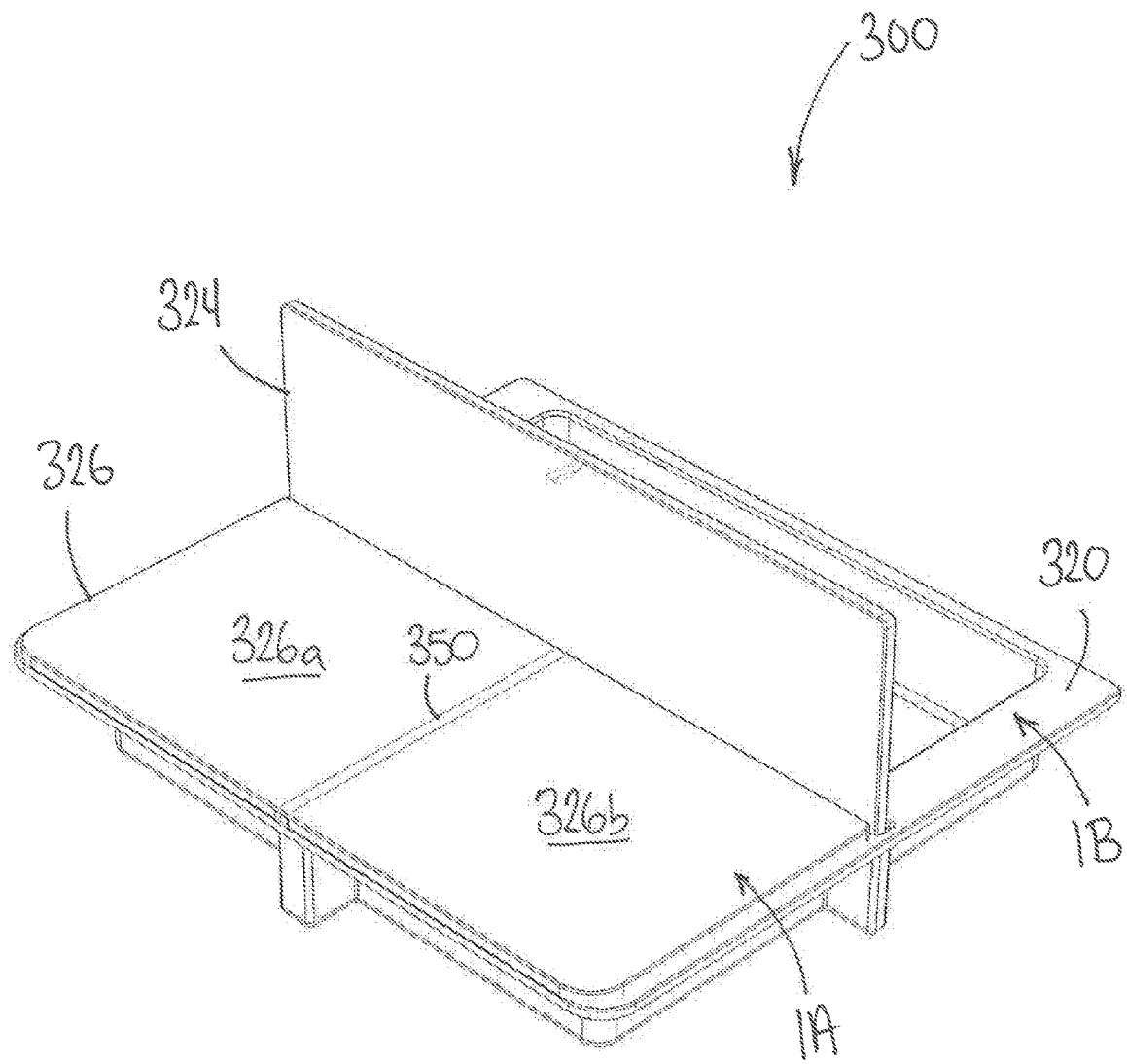
FIG. 20 is a perspective view of the cargo divider system of FIG. 17, wherein the seat-side and gate-side load floors are supported upon the storage bin, the gate-side load floor being shown in a first horizontal position and the seat-side load floor being shown in a second or vertical position.

The seat-side and gate-side load floors 324, 326 are removable from the storage bin 320, and may be arranged in a manner to provide wall dividers. With reference to FIGS. 19 and 20, the seat-side load floor 324 may be moved from a first horizontal position, as shown in FIG. 18, to a second vertical position, as shown in FIG. 20. FIG. 19 shows an intermediate position during the relocation of the seat-side load floor 324. To maintain the seat-side load floor 324 firmly in the vertical orientation, the seat-side load floor 324 is received in a first tower slot 336 and first and second side slots 338, 340 (best seen in FIG. 17). In this way, the cargo compartment is divided into a first storage area 1A and a second storage area 1B having the additional storage capacity of the storage bin 320.

Figure 21:
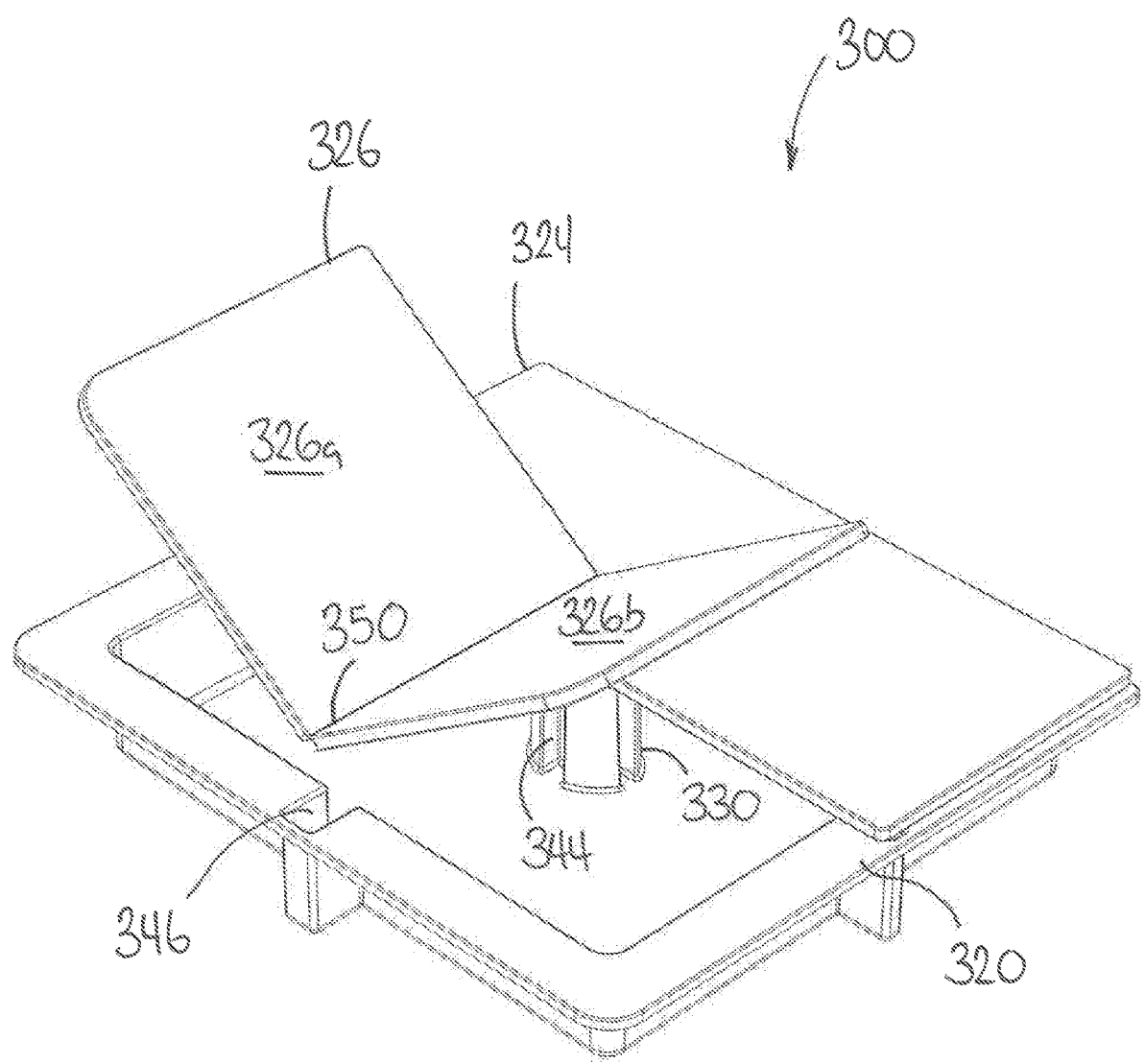
FIG. 21 is a perspective view of the cargo divider system of FIG. 17, wherein the seat-side and gate-side load floors are supported upon the storage bin, the seat-side load floor being shown in a first horizontal position and the gate-side load floor being shown in an intermediate position during relocation thereof.
Figure 22:
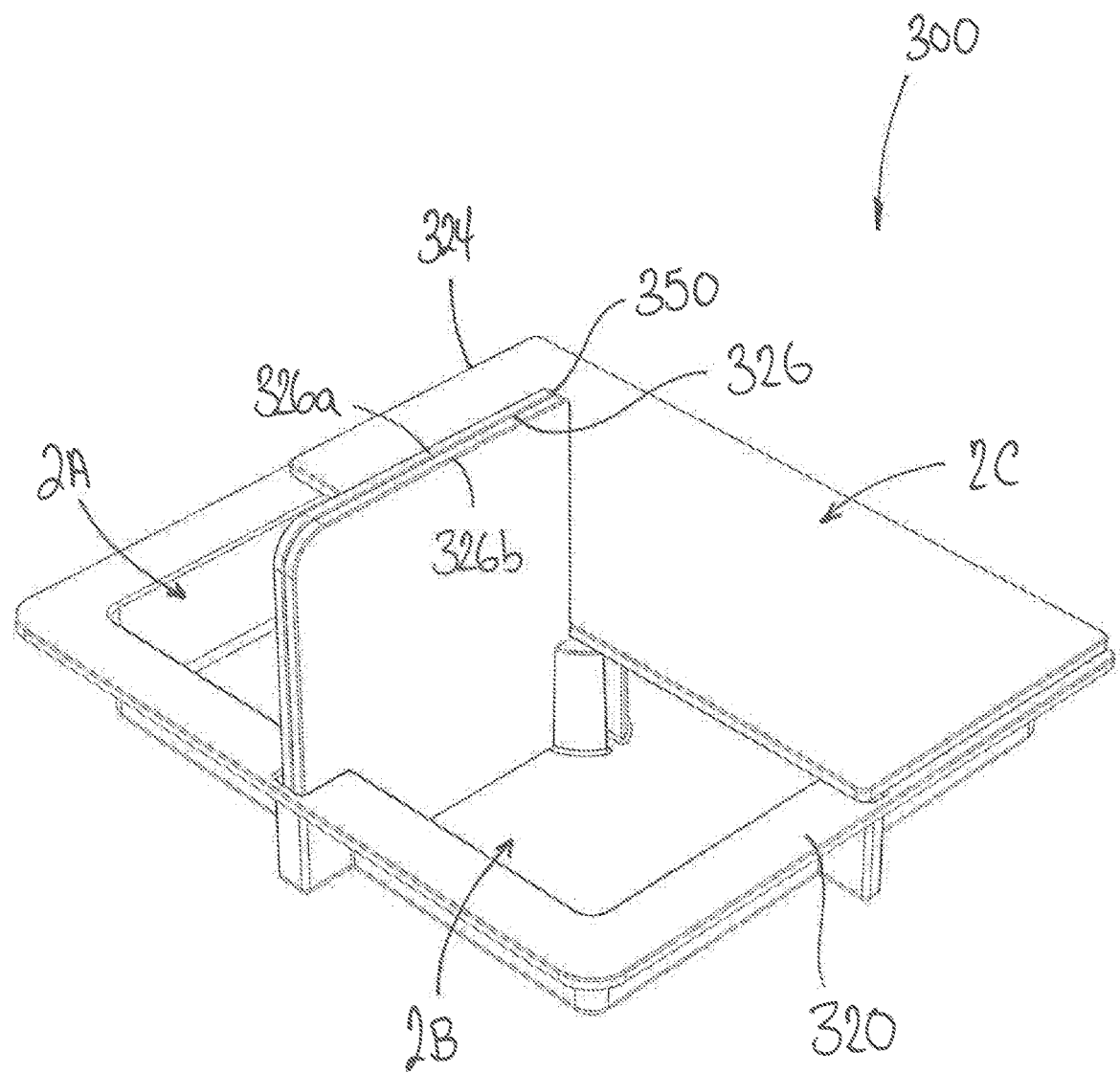
FIG. 22 is a perspective view of the cargo divider system of FIG. 17, wherein the seat-side and gate-side load floors are supported upon the storage bin, the seat-side load floor being shown in a first horizontal position and the gate-side load floor being shown in a second or vertical position.

An alternative arrangement of the cargo divider system 300 is depicted in FIGS. 21 and 22, where the gate-side load floor 326 is moved from a first horizontal position, as shown in FIG. 18, to a second vertical position, as shown in FIG. 22. FIG. 21 shows an intermediate position during the relocation of the gate-side load floor 326. To maintain the gate-side load floor 326 firmly in the vertical orientation, the gate-side load floor 326 is received in a second tower slot 344 and a rear slot 346 (best seen in FIG. 17). In this way, the cargo compartment is divided into a first storage area 2A, a second storage area 2B, and a third storage area 2C. The storage areas 2A and 2B include the additional storage capacity of the storage bin 320.

Figure 23:
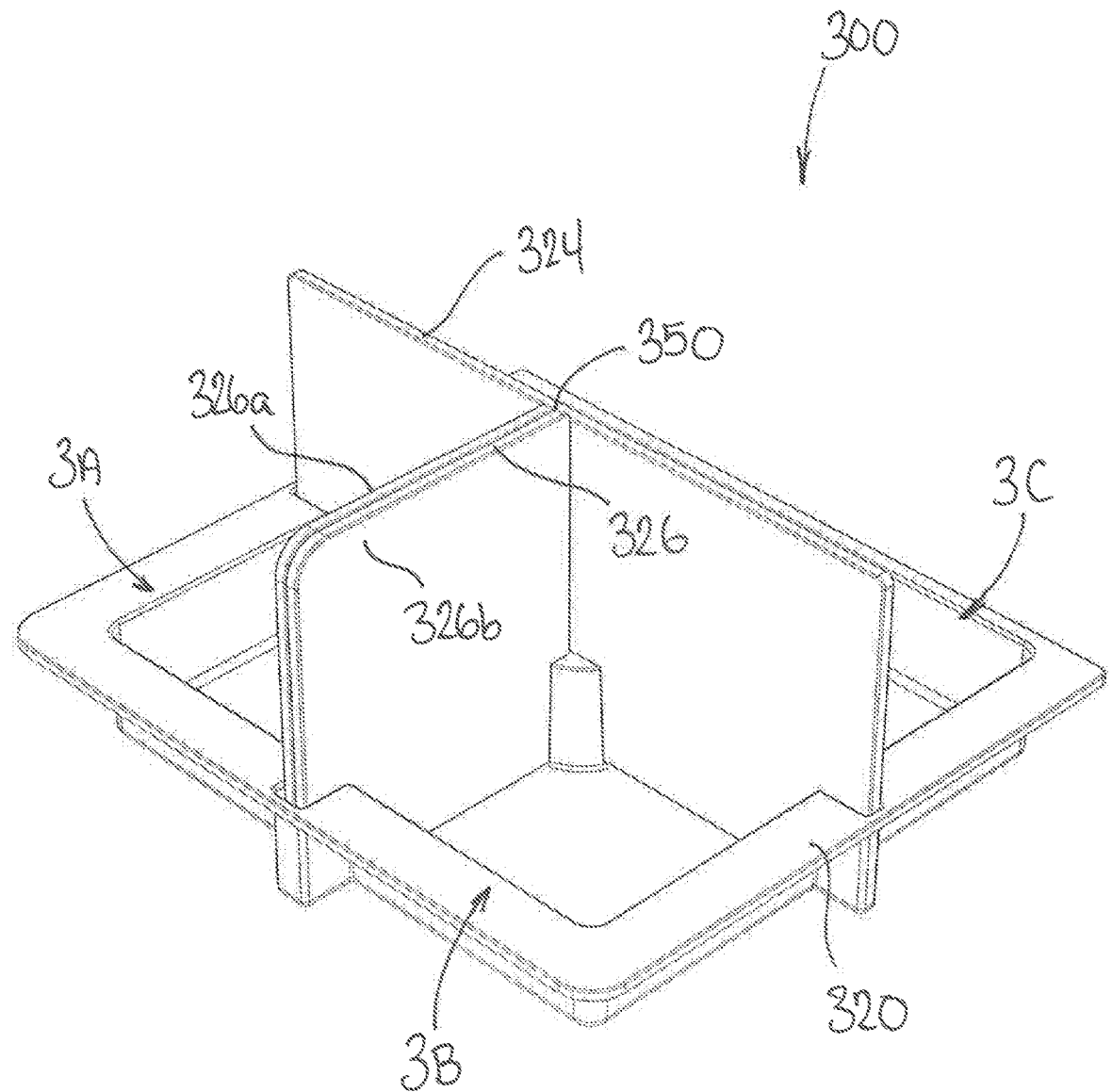
FIG. 23 is a perspective view of the cargo divider system of FIG. 17, wherein the seat-side and gate-side load floors are supported upon the storage bin, the seat-side and gate-side load floors each being shown in a second or vertical position.

A further alternative arrangement of the cargo divider system 300 is depicted in FIG. 23, where both the seat-side and gate-side load floors 324, 326 are positioned in the second vertical position.

In the embodiment shown, the seat-side load floor 324 is provided as a singular panel, while the gate-side load floor 326 includes a first panels 326a and a second panel 326b. To facilitate the relocation of the gate-side load floor 326, the first and second panels 326a, 326b may be hingedly connected. As shown, the first and second panels 326a, 326b are hingedly connected through a living hinge 350, although other hinge arrangements may be suitably implemented.

The storage bin 320 may be made of materials including, but not limited to carbon steel, aluminum or its alloys, and/or engineered plastics including polyamide (PA), PE, HDPE, ABS, PC-ABS, PP, or glass-fiber or carbon fiber reinforced composites of such materials, or composite sandwich materials. Composite sandwich laminate structures such as reinforced paper, metal or polymer honeycomb boards (PCB) may also be used in the construction of the storage bin. The storage bin may additionally include features that serve to provide structural reinforcement or light-weighting characteristics, such as the use of honeycomb reinforcement ribbing.

The storage bin may be manufactured by one or more manufacturing methods including, but not limited to, injection molding, compression molding, thermoforming, stamping, compression/thermoformed, vacuum forming, CNC milling, extrusion, blow-molding, casting, etc.

The seat-side and gate-side load floors 324, 326 may be made of materials including, but not limited to, carbon steel, aluminum or its alloys, and/or engineered plastics including polyamide (PA), PE, HDPE, ABS, PC-ABS, PP, or glass-fiber or carbon fiber reinforced composites of such materials, or composite sandwich materials. Composite sandwich laminate structures such as reinforced paper, metal or polymer honeycomb boards (PCB) may also be used in the construction of the load floors. The seat-side and gate-side load floors 324, 326 may additionally include features that serve to provide structural reinforcement or light-weighting characteristics, such as the use of honeycomb reinforcement ribbing.

The seat-side and gate-side load floors 324, 326 may be manufactured by one or more manufacturing methods including, but not limited to, injection molding, compression molding, thermoforming, stamping, compression/thermoformed, vacuum forming, CNC milling, extrusion, blow-molding, casting, etc.

The load floors may be covered in textile or non-woven textile type or fabric materials including but not limited to PET non-woven fibers, hard plastic skins such as TPO/TPE, laminate films, wood grain, or metallic sheets.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A cargo shelf system for use in a cargo compartment of a vehicle, the cargo shelf system comprising:
   a first support wall and a second support wall, the first support wall and the second support wall being arranged in the cargo compartment in a spaced-apart generally vertical orientation;
   at least one set of removable shelves supported between one of the first support wall and the second support wall and an interior side panel of the vehicle; and
   a set of retractable shelves supported between the first support wall and the second support wall,
   wherein an arrangement of the at least one set of removable shelves and the set of retractable shelves is adjustable from a first stowed position and a second deployed position to provide a user with a range of selectable cargo carrying configurations, and
   wherein the first support wall and the second support wall each include a frame-and-panel structure including a plurality of panels, a peripheral frame that surrounds an assembly of the plurality of panels, and a shelf support cross member disposed at each interface between adjacent panels of the plurality of panels.

2. The cargo shelf system according to claim 1, wherein the at least one set of removable shelves includes two sets of removable shelves, with a first set of removable shelves being supported between the first support wall and a first interior side panel of the vehicle, and a second set of removable shelves being supported between the second support wall and a second interior side panel of the vehicle, the second interior side panel opposing the first interior side panel.

3. The cargo shelf system according to claim 2, wherein each of the first support wall and the second support wall include a first wall panel, a second wall panel, and a third wall panel, and wherein a first said shelf support cross member is disposed between the first wall panel and the second wall panel, and wherein a second said shelf support cross member is disposed between the second wall panel and the third wall panel.

4. The cargo shelf system according to claim 3, wherein the set of retractable shelves includes a first retractable shelf and a second retractable shelf, and wherein the first support wall and the second support wall establish an opposing pair of said first shelf support cross members that support in a sliding relationship the first retractable shelf, and wherein the first support wall and the second support wall establish an opposing pair of said second shelf support cross members that support in a sliding relationship the second retractable shelf.

5. The cargo shelf system according to claim 4, wherein each of the first retractable shelf and the second retractable shelf is constructed from a plurality of hingedly connected slats connected on alternating upper and lower interfaces.

6. The cargo shelf system according to claim 5, wherein each of the first retractable shelf and the second retractable shelf includes on opposing ends thereof a first track roller disposed on a slat proximal a rearward end of the shelf, and a second track roller disposed on a slat proximal a forward end of the shelf, each of the first track roller and the second track roller being configured to be received within a channel disposed on an inboard face of the respective shelf support cross member providing support along each side of the shelf.

7. The cargo shelf system according to claim 6, wherein each of the slats between the forward end and the rearward end of the shelf include on opposing ends thereof a slide member configured to be received within the channel.

8. The cargo shelf system according to claim 7, wherein the slide members are dimensioned with a close tolerance fit so as to slidingly engage an upper bearing surface and a lower bearing surface of the channel.

9. The cargo shelf system according to claim 3, wherein the first set of removable shelves includes a first removable shelf and a second removable shelf, the first removable shelf being supported on a first end thereof within a first shelf support groove on an outboard side of the first shelf support cross member of the first support wall and on a second end thereof by a first shelf support bar disposed on the first interior side panel of the vehicle, and the second removable shelf being supported on a first end thereof within a second shelf support groove on the outboard side of the second shelf support cross member of the first support wall and on a second end thereof by a second shelf support bar disposed on the first interior side panel of the vehicle.

10. The cargo shelf system according to claim 9, wherein the second set of removable shelves includes a third removable shelf and a fourth removable shelf, the third removable shelf being supported on a first end thereof within a first shelf support groove on an outboard side of the first shelf support cross member of the second support wall and on a second end thereof by a first shelf support bar disposed on the second interior side panel of the vehicle, and the fourth removable shelf being supported on a first end thereof within a second shelf support groove on the outboard side of the second shelf support cross member of the second support wall and on a second end thereof by a second shelf support bar disposed on the second interior side panel of the vehicle.

11. The cargo shelf system according to claim 2, wherein the first set of removable shelves includes a first removable shelf and a second removable shelf, the first removable shelf being supported on a first end thereof within a first shelf support groove on an outboard side of a first said shelf support cross member of the first support wall and on a second end thereof by a first shelf support bar disposed on the first interior side panel of the vehicle, and the second removable shelf being supported on a first end thereof within a second shelf support groove on the outboard side of a second said shelf support cross member of the first support wall and on a second end thereof by a second shelf support bar disposed on the first interior side panel of the vehicle, and wherein the second set of removable shelves includes a third removable shelf and a fourth removable shelf, the third removable shelf being supported on a first end thereof within a first shelf support groove on an outboard side of a third said shelf support cross member of the second support wall and on a second end thereof by a first shelf support bar disposed on the second interior side panel of the vehicle, and the fourth removable shelf being supported on a first end thereof within a second shelf support groove on the outboard side of a fourth said shelf support cross member of the second support wall and on a second end thereof by a second shelf support bar disposed on the second interior side panel of the vehicle.

12. A cargo shelf system for use in a cargo compartment of a vehicle, the cargo shelf system comprising:
a first support wall and a second support wall, the first support wall and the second support wall being arranged in the cargo compartment in a spaced-apart generally vertical orientation;
at least one set of removable shelves, wherein each shelf of the at least one set of removable shelves is moveable between a first position in which the shelf extends between one of the first support wall and the second support wall and an interior side panel of the vehicle and a second position in which the shelf does not extend between one of the first support wall and the second support wall and the interior side panel of the vehicle; and
a set of retractable shelves supported between the first support wall and the second support wall, each retractable shelf of the set of retractable shelves including a plurality of hingedly connected slats connected on alternating upper and lower interfaces, wherein each shelf of the set of retractable shelves is adjustable between a first position in which the slats are retracted and a second position in which the slats are extended, and
wherein each of the first support wall and the second support wall include a first wall panel, a second wall panel, and a third wall panel, and wherein a first shelf support cross member is disposed between the first wall panel and the second wall panel, and wherein a second shelf support cross member is disposed between the second wall panel and the third wall panel.

13. The cargo shelf system according to claim 12, wherein the set of retractable shelves includes a first retractable shelf and a second retractable shelf, and wherein the first support wall and the second support wall establish an opposing pair of said first shelf support cross members that support in a sliding relationship the first retractable shelf, and wherein the first support wall and the second support wall establish an opposing pair of said second shelf support cross members that support in a sliding relationship the second retractable shelf.

14. The cargo shelf system according to claim 13, wherein each of the first retractable shelf and the second retractable shelf includes on opposing ends thereof a first track roller disposed on a slat proximal a rearward end of the shelf, and a second track roller disposed on a slat proximal a forward end of the shelf, each of the first track roller and the second track roller being configured to be received within a channel disposed on an inboard face of the respective shelf support cross member providing support along each side of the shelf.

15. The cargo shelf system according to claim 14, wherein each of the slats between the forward end and the rearward end of the shelf include on opposing ends thereof a slide member configured to be received within the channel and wherein the slide members are dimensioned with a close tolerance fit so as to slidingly engage an upper bearing surface and a lower bearing surface of the channel.

16. The cargo shelf system of claim 12, wherein when in the second position, each shelf of the at least one set of removable shelves is removed from the cargo shelf system and stowed for later use.

17. A cargo shelf system for use in a cargo compartment of a vehicle, the cargo shelf system comprising:
- a first support wall and a second support wall, the first support wall and the second support wall being arranged in the cargo compartment in a spaced-apart generally vertical orientation;
- at least one set of removable shelves, wherein each shelf of the at least one set of removable shelves is moveable between a first position in which the shelf extends between one of the first support wall and the second support wall and an interior side panel of the vehicle and a second position in which the shelf does not extend between one of the first support wall and the second support wall and the interior side panel of the vehicle; and
- a set of retractable shelves supported between the first support wall and the second support wall, each retractable shelf of the set of retractable shelves including a plurality of hingedly connected slats connected on alternating upper and lower interfaces, wherein each shelf of the set of retractable shelves is adjustable between a first position in which the slats are retracted and a second position in which the slats are extended, and
- wherein each shelf of the at least one set of removable shelves is hingedly connected to one of the first support wall and the second support wall and is rotated relative thereto when moved from the first position to the second position.

* * * * *